United States Patent
Nakayama et al.

(10) Patent No.: US 11,422,824 B2
(45) Date of Patent: Aug. 23, 2022

(54) COMPUTER ACTIVATION METHOD

(71) Applicant: AKIB SYSTEMS INC., Tokyo (JP)

(72) Inventors: Hideto Nakayama, Tokyo (JP); Kentaro Iwasawa, Tokyo (JP)

(73) Assignee: AKIB SYSTEMS INC., Tokyo (JP)

( * ) Notice: Subject to any disclaimer, the term of this patent is extended or adjusted under 35 U.S.C. 154(b) by 0 days.

(21) Appl. No.: 16/895,749

(22) Filed: Jun. 8, 2020

(65) Prior Publication Data
US 2020/0301717 A1    Sep. 24, 2020

Related U.S. Application Data

(63) Continuation of application No. PCT/JP2017/044132, filed on Dec. 8, 2017.

(51) Int. Cl.
*G06F 9/4401* (2018.01)
*G06F 1/26* (2006.01)
*G06F 13/40* (2006.01)
*G06F 13/42* (2006.01)

(52) U.S. Cl.
CPC .............. *G06F 9/4401* (2013.01); *G06F 1/26* (2013.01); *G06F 9/4403* (2013.01); *G06F 9/4406* (2013.01); *G06F 9/4411* (2013.01); *G06F 13/4027* (2013.01); *G06F 13/4221* (2013.01); *G06F 2213/0024* (2013.01); *G06F 2213/0026* (2013.01)

(58) Field of Classification Search
CPC ...... G06F 9/4401; G06F 1/26; G06F 13/4027; G06F 13/4221; G06F 2213/0024; G06F 2213/0026; G06F 9/4411
See application file for complete search history.

(56) References Cited

U.S. PATENT DOCUMENTS

| | | | |
|---|---|---|---|
| 7,580,826 B2 | 8/2009 | Vega et al. | |
| 2005/0193189 A1* | 9/2005 | Kim | G06F 9/4416 713/1 |
| 2010/0241781 A1 | 9/2010 | Wetzel et al. | |
| 2012/0110233 A1 | 5/2012 | Higuchi et al. | |
| 2013/0159582 A1* | 6/2013 | Tongen | G06F 13/4045 710/300 |

FOREIGN PATENT DOCUMENTS

| | | |
|---|---|---|
| JP | 2003-067090 A | 3/2003 |
| JP | 2006-018814 A | 1/2006 |
| JP | 2011215889 A * | 10/2011 |

(Continued)

OTHER PUBLICATIONS

EPO Machine translation JP2011215889A description (Year: 2011).*

(Continued)

*Primary Examiner* — Glenn A. Auve
(74) *Attorney, Agent, or Firm* — Oliff PLC

(57) ABSTRACT

In a system of a computer such as an HPC having one or more motherboards mounted therein, smooth activation is executed. The computer is activated while I/O devices other than the minimum number of I/O devices required for activation of computer are hidden. Subsequently, a BIOS is activated, and a BootLoader is activated. The activated BootLoader restarts the hidden I/O devices, and recognizes the I/O devices can be used by an OS or an application.

13 Claims, 11 Drawing Sheets

(56) References Cited

FOREIGN PATENT DOCUMENTS

| JP | 2012-059294 A | 3/2012 |
| JP | 2012-168650 A | 9/2012 |
| JP | 2015-172807 A | 10/2015 |
| WO | 2011/004548 A1 | 1/2011 |

OTHER PUBLICATIONS

EPO Machine translation JP2015172807A description (Year: 2015).*
EPO Machine translation JP2003067090A description (Year: 2003).*
Feb. 27, 2018 International Search Report issued in International Patent Application No. PCT/JP2017/044132.
Jun. 9, 2020 International Preliminary Report on Patentability issued in International Patent Application No. PCT/JP2017/044132.

* cited by examiner

Embodiment 1

Embodiment 4

COMPUTER ACTIVATION METHOD

FIELD OF INVENTION

The present invention relates to a computer activation method. For example, the invention relates to a method to provide the smooth activation of a computer including a single Motherboard and a computer configured by integrating a plurality of node computers.

PRIOR ART

Today, a technique has been widely used to structure a computer having a higher performance by combining a plurality of node computers. A method has been also widely used by which such a technique is used to realize HPC (High Performance Computing).

The inventors of this application also perform the earnest research and development of a system to use a computer internal slot (PCI-Express) to integrate a plurality of computers.

In particular, a technique has been developed to add a routing control function while using the PCI-Express. The inventors of this application have used this technique to suggest various techniques to connect a plurality of computers via the PCI-Express to realize the I/O virtualization. This I/O virtualization allows a user to use the I/O devices of other node computers as an I/O device for him or her and can virtually structure a high-performance computer (e.g., computers realizing the above HPC).

PCI-Express

Today, the PCI-Express has been widely used as a computer internal slot. The PC1-Express can provide a high-speed communication compared with a conventional PCI. For example, a PCI-Express2.0 (Gen2) provides 5.0 Gbps in one direction in a physical band per one lane that is a data transfer speed of 500 Mbyte/sec. The PCI-Express2.0 (Gen2) has been recognized as a high-speed internal slot. A PCI-Express3.0 (Gen3)(2010) providing a further higher speed also has been provided (8.0 Gbps in one direction in a physical band). Currently, a PCI-Express4.0 (Gen4) has been examined (that has a speed two times higher than that of Gen3).

General Configuration of Computer Using PCI-Express

FIG. 10 shows an example of the general configuration of a computer 80 including a PCI-Express internal port (which also may be called an "internal slot" or "internal bus", for example or also may be called an "expansion slot" or "expansion bus" based on the meaning).

When the PCI-Express is used, the CPU 100 is firstly connected to a root complex 110 (hereinafter also simply referred to as "RC"). The RC 110 has a plurality of PCI-Express ports. However, the RC 110 also may additionally have switches 120*b*, 120*c*, and 120*d* so as to achieve a required number of ports. These switches 120 also may be connected in a multi-stage manner in order to provide a required number of ports (see FIG. 10).

An I/O device is called an end point and is connected to the switch 120*b* or the switch 120*d*, for example. Various end points exist, including general PCI-Express end points 130*a*, 130*b*, or 130*c* directly connected to the PCI-Express port of the switch 120 or a root complex end point 134 connected to the RC 110, for example.

In FIG. 10, the mark "○" represents a PCI-Express port.

The PCI-Express port also may have a so-called bridge to provide the protocol conversion with another bus. In the example of FIG. 10, a PCI bridge 136 is shown that performs the protocol conversion with a PCI bus as a conventional bus, for example. This bridge can be used to provide the conversion from the PCI-Express to the PCI bus.

FIG. 10 is illustrated to show the PCI-Express at the center. In an actual case, a memory 140 and storage means such as a hard disk are also provided. Although not shown, PCI-Express graphics 142 (see FIG. 10) is connected to a display apparatus. A mouse or a keyboard (not shown) or the like is connected to a system bus (see FIG. 10) via a predetermined interface.

As is clear from FIG. 10 and the above description, this PCI-Express is a so-called p-p(point-to-point) communication path to provide one-to-one communication. Thus, a switch 120 is required for the connection of a plurality of I/O devices as shown in FIG. 10.

Computer system uniquely suggested by the inventors of this application The inventors of this application has uniquely developed a system to provide the mutual connection of computers via the above-described computer PCI-Express and has suggested a computer system that can provide a so-called I/O virtualization. The computer system as described above allows a user to access, via a PCI-Express connected to his or her computer, the I/O device of another node computer as an I/O device for him or her, thus realizing the I/O virtualization.

The international patent application (PCT/JP2013/073637) having the contents as described above was filed on Sep. 3, 2013.

The use of such a computer system can easily realize the HPC having a higher performance.

Prior Art Document

The following Patent Document 1 discloses a method to dynamically add a virtual device to a virtual computing environment. In particular, a method is disclosed according to which, in addition to a device list, a virtual device can be dynamically added using an external device directory including software plug-in to add a virtual device.

The following Patent Document 2 discloses an apparatus and a method according to which the network traffic required to search a device is reduced. In particular, an apparatus and a method according to which the search operation is performed for each subnet by acquiring the device information for each subnet.

The following Patent Document 3 discloses an apparatus and a method according to which the I/O device at each processor node is switched without requiring the reactivation of the computer.

PRIOR ART DOCUMENT

Patent Document

Patent Document 1: Japanese Unexamined Patent Application Publication No. 2006-018814
Patent Document 2: Japanese Unexamined Patent Application Publication No. 2012-059294
Patent Document 3: Japanese Unexamined Patent Application Publication No. 2012-168650

SUMMARY OF THE INVENTION

Problem to be Solved by the Invention

As described above, the inventors of this application realizes a computer that has a configuration in which computer I/Os are mutually connected using the PCI-Express. According to such a computer system, users can "see" the I/Os of other (node) computers, thus easily realizing the so-called I/O (I/O device virtualization).

In order to realize such a computer, the inventors of this application use a uniquely-developed switch 10 (connection apparatus) as shown in FIG. 11 to mutually connect the respective node computers. As shown in FIG. 11, this switch 10 includes PCI-Express ports 20a, 20b, 20c, 20d, and 20e. The respective ports 20 can be connected to node computers 22a, 22b, 22c, 22d, and 22e.

The switch 10 as described above allows the I/O devices in the respective node computers to "see" one another via the PCI-Express. Thus, the users can use any of the I/O devices, thus realizing the so-called I/O virtualization.

The PCI-Express ports 20a, 20b, 20c, 20d, and 20e of the switch 10 also can be connected to a general PCI-Express I/O device.

The configuration using the switch 10 as described above also can realize a virtual network connection by burying a network frame in a PCI-Express TLP. This can consequently realize a configuration in which the respective node computers are connected via a network. Such a technique is also uniquely developed by the inventors of this application.

According to the inventors of this application, a system is uniquely developed in which the switch 10 uses a predetermined routing control algorithm so that the switch 10 also can be used as a routing control unit. The configuration as described above allows the routing control to be introduced in the PCI-Express.

Device List

However, in the case of the computer system as described above, the node computer of the user can "see" the I/O devices of other node computers 22. Thus, a device list is unnecessarily prepared with regard to all of the I/O devices "seen" from the user during the activation. The device list is a list of the I/O devices that can be used by the computer of the user and is prepared by BIOS(UEFI) during the activation. After the activation of the OS, the OS or an application uses the device list to access the I/O device.

During the activation, the BIOS of each node computer 22 determines the memory size or the allocation size. Specifically, the BIOS determines the memory allocation. In particular, the above computer system using the PCI-Express prepares the list of the allocations of all nodes. Specifically, the respective node computers 22 are "seen" during the activation and thus the information of these node computers 22 are entirely stored in the memory. As a result, such a device list is prepared that is based not only on the computer of the user but also on the I/O devices of all node computers 22 seen from the user. This causes a possibility where the memory management range (e.g., 32 GB, 16 GB, 4 GB) that can be handled by the BIOS is undesirably exceeded, causing a possibility of an error caused during the activation.

Thus, according to the inventors of this application, in order to establish the computer system in which a plurality of node computers 22 are integrated through the PCI-Express as described above, the mutual connection by the connection apparatus of the PCI-Expresses of the respective node computers was cancelled. Specifically, consideration was provided that the respective node computers were activated while the connection by the connection apparatus was being cut off so that other node computers cannot "see" one another, for example.

Another requirement was that, after all node computers 22 were activated, the respective node computers 22 must be connected by the connection apparatus (switch 10) to subsequently reconfigure the device list based on a predetermined application level.

Improvement of the method of configuring the device list in the computer system based on the concept suggested by the inventors of this application The above computer system suggested by the inventors of this application can configure, with a low cost, an excellent HPC by integrating a plurality of node computers 22 using the PCI-Express. However, the complicated operation was required in order to activate the system as described above. Specifically, it was required to cancel the connection among the respective node computers 22 to subsequently activate the node computers 22 independently, then the node computers 22 were again connected to reconfigure the device list, for example. Another requirement was that this reconfiguration or the like must be performed individually by preparing a predetermined application. Thus, the operation to activate the computer system tended to be complicated, thus requiring a long activation time.

In view of the point as described above, the inventors of this application have continued to perform the keen research on the method to activate the system in a simpler manner, thus reaching the invention of this application in consideration of various computers developed in recent years. The following section will describe the details of the invention of this application through the following description (i.e., means for solving the problem, embodiment for carrying out the invention, and the drawings, for example).

Situation Among Computers in Recent Years and the Social Background

The following section will describe the background of the computer techniques in recent years in order to describe the details of the invention of this application.

The reality is that the BIOS (or UEFI) cannot handle the increase of the I/O memory space in today's computing technology. For example, the current situation is that the BIOS side can handle the increase of simple physical memories by the wide use of IA32 PAE (Physical Address Extention) or IA32_64.

However, the increase of the I/O memory spaces are still insufficiently accommodated in some cases. For example, in recent years, the nVida Tesla K20 requires a 256 MB memory space and the Intel Xeon Phi requires an 8 GB I/O memory space, respectively. For example, the reality for the HPC having a configuration using a plurality of such cards is that there are a very limited number of types of motherboards available for the HPC (BIOS (mounted on the Motherboard)), thus undesirably providing a limited number of options. Thus, in the case of a general motherboard (BIOS (mounted on the Motherboard)), the activation is frequently impossible due to the above-described reason.

As described above, the reality is that the activation cannot be simply performed and requires various complicated operations not only for the computer system using the PCI-Express suggested by the inventors of this application but also for a computer system obtained by including a plurality of computers (Motherboards).

Objective of the Invention of this Application

The present invention has been made in view of the technical background regarding the computer including a plurality of node computers and the situation among computers in recent years. It is an objective of the invention to realize a method of smoothly carrying out the computer activation. Specifically, the main objective is to realize a system by which a computer system in which a single or a plurality of Motherboard(s) is/are mounted (e.g., HPC) can be activated in a smooth manner.

The realization of such a system can provide the activation of the computer in a smoother manner.

Furthermore, the realization of such a system can provide the increase of the number of the types of selectable motherboards (BIOS (mounted on the Motherboard)), thus providing a significant advantage that a more low-cost Motherboard can be used to structure a computer (e.g., HPC).

Means for Solving the Problem

A. Basic Concept (Analysis of the Problem)

First, the inventors of this application analyzed the above problem in the following manner.

(1) Activation Process

The activation sequence of a computer (also may be called a PC) is allowed to proceed by activating the respective softwares generally in an order as shown below.

BIOS→Boot Loader→Kernel (OS Kernel)

The Boot Loader also may activate another Boot Loader. In any case, the OS Kernel is activated after the activation of the BIOS and the Boot Loader in this order.

(2) Cause of the Undesirable Stoppage of the Computer Activation

As described above for the problem, the stoppage of the computer during the activation is presumably caused by the stoppage during the BIOS operation. Specifically, the stoppage of the activation may be caused because memories (including the memory used by the I/O device) undesirably exceed the memory management range of the BIOS due to the connection of a plurality of computers, for example.

B. Principles of the Solution by the Present Invention (1) Minimum Configuration In view of the above, the inventors of this application have reached the concept that such a stoppage can be avoided by allowing, during the BIOS activation, the BIOS to see only the minimum device configuration (hereinafter referred to as the minimum configuration).

Specifically, the concept is that an unnecessary device is separated and hidden from the BIOS during the activation. The term "minimum configuration" means the minimum configuration required to activate the Boot Loader including graphic, USB, SATA/SAS, PS/2, serial/parallel (or a network in some cases), for example.

As described above, the term "minimum configuration" means a configuration required to activate the Boot Loader. A specific minimum configuration is different depending on each motherboard or computer. For example, a graphic function may be unnecessary or an interface such as USB may be unnecessary for the activation. Alternatively, an interface such as PS/2 or the serial/parallel one may be unnecessary.

As described above, the minimum-required configuration to activate the Boot Loader (minimum configuration) specifically includes the operations as shown below.

Specifically, the operations to:

(i) hide devices other than the minimum configuration; and (ii) hide device drivers other than the minimum configuration and not to load the device drivers.

These operations are included in "the activation by the minimum-required configuration (minimum configuration)".

The concept is that the bus reinitialization and the allocation of the I/O memory required for the I/O device are provided prior to the loading of a device driver exclusive for the I/O device to thereby subsequently allow the I/O device group to be freely configured (after the activation of the Kernel), for example. Specifically, the concept is that device drivers other than the minimum configuration are loaded (after the activation of the Kernel).

The I/O device of the minimum configuration capable of providing the activation of the computer is simply referred to as "minimum configuration" or "the I/O device of the minimum configuration".

(2) The Device Configuration of a Part Not Exceeding the Memory Management Range On the other hand, a to-be-hidden (hidden) device does not always have to have the minimum configuration and is only required to provide the activation of the Boot Loader. Specifically, the activation can be presumably smoothly provided by hiding devices for which the BIOS memory management range is undesirably exceeded.

Thus, the smooth activation can be considered to be provided by hiding devices for which the BIOS memory management range is undesirably exceeded to perform the activation only based on the device configuration for which the management range is not exceeded.

In an embodiment described later, an example will be mainly described in which the I/O device other than the minimum configuration is hidden. However, the term "the I/O device other than the minimum configuration" is synonymous with "the I/O device(s) for which the BIOS memory management range is undesirably exceeded" to provide a similar effect.

C. The Combination of Solutions in the Present Invention (1) According to the applicant of the present invention, the above-described solution principle can be realized and the above problem can be solved mainly by the following two stages of:

(First stage) to hide, during the activation, the I/O devices other than the I/O device of the minimum configuration from the BIOS; and (Second stage) to subsequently cancel the hiding of the I/O devices at a predetermined timing to configure a device list including these I/O devices.

The following section will describe the specific processings and configurations of the respective stages in the following (2) to (3).

(2) Hiding of I/O Devices During the Activation

The following methods (a), (b), and (c) are specific means to hide a configuration (I/O device) causing the stoppage of the activation during the activation to subsequently provide the activation.

(a) The power supply to the I/O devices other than the minimum configuration is controlled by a microcontroller, for example. During the subsequent BIOS activation, the power supply to the I/O devices other than minimum configuration is blocked.

(b) A PCI-Express switch is connected to a computer. The I/O devices other than minimum configuration are provided at the downstream of the PCI-Express switch. Then, during the BIOS activation, a downstream port of PCI-Express switch (a port in the downstream direction) is disabled.

(c) Such a configuration is used in which FPGAs/exclusive ASICs are provided and the I/O devices other than the minimum configuration are connected to a computer using these FPGAs. Specifically, the I/O device is used as a virtual device by using the FPGAs or the like to provide the connection.

When the virtual device is provided using the FPGAs/exclusive ASICs, the FPGAs/exclusive ASICs must have a predetermined virtualization setting. Thus, after the computer is powered ON, the I/O device to be used as a virtual device is not seen from the BIOS (or is hidden), thus providing the BIOS activation in a smooth manner.

A status of a virtual device unit that cannot be virtually used immediately after the power is ON is called an inactive status. A status in which the above-described virtualization setting is provided is called an active status.

In the above description, although the FPGAs/exclusive ASICs were used as a virtual device, any unit can be used so long as the unit (called a virtual device unit) can be used as a virtual device. In an embodiment described later, a routing control unit will be described as one preferred example of the virtual device unit. However, any apparatus may be used so long as the apparatus can be used as a virtual device for the I/O device.

The FPGAs/exclusive ASICs may use a physical transfer means such as various transfer means or transmission means. For example, PCI or the PCI-Express may be preferably used in addition to other various LAN connection methods. LAN typically includes the widely-used Ethernet® but is not limited thereto and may use other connection forms.

By using these methods (a), (b), and (c), I/O devices requiring a large memory space during the BIOS activation can be hidden from the BIOS. In the above methods (a), (b), and (c), an example is shown in which the I/O devices other than the minimum configuration are hidden. However, I/O devices for which the management range of the BIOS memory of the Motherboard is exceeded also may be hidden.

(3) The Activation of the Hidden I/O Device

After the BIOS is activated based on the above method, the hidden I/O devices must be enabled at the timings (d) and (e) as shown below.

Timing (d)

During the activation of the Boot Loader, the I/O devices hidden using the above methods (a), (b), and (c) are enabled.

When the method of the above (a) is used for example, the I/O devices can be powered ON by a microcomputer control. When the method of the above (b) is used for example, the downstream port of the PCI-Express switch (the port in the downstream direction) can be enabled. When the method of the above (c) is used, the FPGAs/exclusive ASICs can be operated to enable the I/O devices.

In this manner, after the respective devices are enabled, a to-be-connected bus is proved again to recognize the respective I/O devices to be connected to the bus. For example, when the PCI-Express is used as the above bus, it is preferred that a configuration space suitable for the PCI-Express is read and a required BAR (Base Address Register) is assigned after which a control is given to the OS Kernel. The BAR determines the I/O space that can be used by the device, the type of the memory space, the capacity, and the position to allocate or assign the determined ones. Thereafter, the hidden I/O device can be used. In this case, nothing is needed to be performed by the OS Kernel for the hidden I/O device.

In order to realize the above timing (d), the I/O device must be proved again by the Boot Loader (the Boot Loader including a device prover). The activation is performed in the following order, for example.

BIOS→Device Prover→Boot Loader→Kernel (OS)

The activation is performed one after another in the above order.

Timing (e)

During the activation of the OS Kernel, the I/O devices hidden using the above methods (a), (b), and (c) are enabled.

By activating the OS Kernel, the PCI PnP (flag & Play) can be expected to operate. Thus, the hidden I/O devices enabled by the above methods can be expected to be automatically recognized by the OS.

However, the recent I/O devices tend to require an extremely-large I/O memory space. Thus, memory address windows connected thereto must be rewritten in an order of the higher ones. The term "memory address window" means the range (scope) of addresses used under the Switch (e.g., the PCI-Express switch).

In the case of this timing (e), the activation is performed in the following order, for example.

BIOS→Boot Loader→Kernel+improved device driver+Kernel patch

The activation is performed one after another in the above order.

The improved device driver is activated by the OS Kernel. In order to perform this activation, the Kernel requires a patch. This improved device driver rewrites the device list as a list of the I/O devices. Then, the OS Kernel uses the new device list. Through the operation as described above, the OS (or the Kernel thereof) can also use the new device list to access and use the hidden I/O devices.

(4) Consideration for the Timings

As described above, in the above (3), the timings at which the hidden I/O devices are activated have been described. The following section will describe these timings.

In principle, the hidden I/O devices are preferably cancelled immediately after the BIOS is activated. Thus, the method based on the above timing (d) is preferred in principle.

In the case where this timing (d) is used however, a slightly-complicated procedure may be required in order to perform the method via a network (e.g., in order to use the method of the above (c) is used). As described above, when (c) the FPGAs/exclusive ASICs are provided and are used as a virtual device and a network (e.g., Ethernet) is used as a transmission path, the I/O devices must be accessed over the network. Thus, a network device must be enabled in order to connect to the network or a TCP/IP may be also required in order to access the I/O devices.

Thus, it may be generally difficult that the I/O device is activated at the above timing (d) while using the method (c) on the I/O devices connected to the network.

In view of this, the inventors of this application have developed a computer system to use the PCI-Express to connect the respective node computers. Thus, this computer system allows the method of the above (c) to be used with the PCI-Express used as a transmission path. This consequently allows the computer system to easily activate, while using the method (c), the I/O devices hidden at the above timing (d).

Specifically, the computer system uniquely developed by the inventors of this application does not use the Ethernet. Thus, the I/O device can be activated at the above timing (d) while allowing the method (c) to hide the I/O devices.

(4a)

When the I/O devices connected via a network using the method of the above (c) are hidden, it is generally preferred that the above timing (d) is not used and the hidden I/O devices are activated at the timing (e) (i.e., at the stage of the OS Kernel).

(4b)

In the above (4), it was described that the method of the above timing (d) can be used in the case of the computer system to connect the respective node computers using the PCI-Express. However, in the case of a computer system connected by means other than the network (e.g., transmission path, PCI, USB), it may be also preferred that the I/O devices are enabled during the activation of the Boot Loader at which timing (the Boot Loader) prepares the device list of the I/O devices as described for the above (4). Specifically, the timing (d) may be used when other transmission paths other than the network are used.

Specifically, the inventors of this application have reached the configuration as described below through the research as described above.

D. Specific Configuration of the Invention of this Application

The invention has been made in view of the above problem. Specifically, the invention uses the following configuration in order to solve the above problem.

(1) In order to solve the above problem, the invention provides a method of activating a computer characterized in including: the first hiding step of blocking the power supply to I/O devices other than the minimum I/O device required to activate the computer; a step of powering ON the computer; a first cancellation step of allowing, after the BIOS of the computer is activated and before the I/O devices are proved again by a Device Prover, the Device Prover to cancel the blocking of the power supply in the first hiding step; and a Boot Loader activation step of activating the Boot Loader of the OS after the I/O devices for which the blocking of the power supply is cancelled is proved again by the Device Prover.

(2) In order to solve the above problem, the invention provides a method of activating a computer characterized in including: the first hiding step of blocking the power supply to I/O devices other than the minimum I/O device required to activate the computer; a step of powering ON the computer; the second cancellation step of allowing, after the OS Kernel of the computer is activated and before the I/O devices are proved again by a Device Prover, the Device Prover to cancel the blocking of the power supply in the first hiding step; and a step of allowing the activated Device Prover to prove again the I/O devices for which the blocking of the power supply is cancelled.

(3) According to the present invention, in the method of activating a computer in the above (1) or (2), processors other than the computer in the first hiding step block the power supply to the I/O devices other than the minimum I/O device required to activate the computer.

(4) The present invention provides, in order to solve the above problem, a method of activating a computer including a switch means to provide the connection to an I/O device included in a computer, in which the I/O devices other than the minimum I/O device required to activate the computer are connected to the downstream side of the switch means and the upstream side of the switch means is connected to a system bus of the computer, characterized in including: the second hiding step of disabling the downstream side of the switch means; a step of powering ON the computer; the third cancellation step of allowing, after the BIOS of the computer is activated and before the I/O devices are proved again by a Device Prover, the Device Prover to enable the downstream side of the switch means; and a Boot Loader activation step of allowing the Device Prover to prove again the I/O devices via the switch means having the enabled downstream side to subsequently activate the Boot Loader of the OS.

(5) The present invention provides, in order to solve the above problem, a method of activating a computer including a switch means to provide the connection to an I/O device included in a computer, in which the I/O devices other than the minimum I/O device required to activate the computer are connected to the downstream side of the switch means and the upstream side of the switch means is connected to a system bus of the computer, characterized in including: the second hiding step of disabling the downstream side of the switch means; a step of powering ON the computer; the fourth cancellation step of allowing, after the OS Kernel of the computer is activated, the Device Prover to enable the downstream side of the switch means; and a step of allowing the activated Device Prover to prove again the I/O devices via the switch means having the enabled downstream.

(6) The present invention is characterized in that, in the method of activating a computer in the above (4) or (5), in the second hiding step, after the power supply is once blocked, a circuit for outputting a signal to disable the downstream side of the switch means disables the downstream side of the switch means.

(7) The present invention is characterized in that, in the method of activating a computer in the above (4) or (5), in the second hiding step, a command is sent to the switch means so as to disable the downstream side of the switch means and the switch means includes a storage means to store a setting status in which the downstream side is disabled.

(8) The present invention is characterized in that, in the method of activating a computer in any one of the above (4) to (7), the switch means is a PCI-Express switch.

(9) The present invention provides, in order to solve the above problem, a method of activating a computer including a virtual device unit to connect the I/O device as a virtual device to the computer in which I/O devices other than the minimum I/O device required to activate the computer are connected to the computer via the virtual device unit, characterized in including: the third hiding step of setting the virtual device unit in an inactive status; a step of powering ON the computer; the fifth cancellation step of allowing, after the BIOS of the computer is activated and before the I/O devices are proved again by a Device Prover, the Device Prover to set the virtual device unit in an active status; and a Boot Loader activation step of activating the Boot Loader of the OS after the I/O devices used as a virtual device are proved again by the Device Prover via the virtual device unit.

(10) The present invention provides, in order to solve the above problem, a method of activating a computer including a virtual device unit to connect the I/O device as a virtual device to the computer in which I/O devices other than the minimum I/O device required to activate the computer are connected to the computer via the virtual device unit, characterized in including: the third hiding step of setting the virtual device unit to be inactive; a step of powering ON the computer; the sixth cancellation step of allowing, after the Kernel of the OS of the computer is activated, the Device Prover to set the virtual device unit in an active status; and a step of allowing the activated Device Prover to prove again the I/O devices via the virtual device unit having the active status.

(11) The present invention is characterized in that, in the method of activating a computer in the above (1) or (2), the first hiding step blocks the power supply to I/O devices not within the memory management range of the BIOS of the computer instead of the I/O devices other than the minimum I/O device required to activate the computer.

(12) The present invention is characterized in that, in the method of activating a computer in the above (4) or (5), the downstream side of the switch means is connected to the I/O devices not within the memory management range of the BIOS of the computer instead of the minimum I/O device required to activate the computer.

(13) The present invention is characterized in that, in the method of activating a computer in the above (9) or (10), the downstream side of the switch means is connected to the I/O devices not within the memory management range of the BIOS of the computer instead of the minimum I/O device required to activate the computer.

Effect of the Invention

As described above, according to the present invention, a predetermined device is hidden during the activation so that the predetermined device cannot be seen from the BIOS, for example, thus providing the smooth activation of the computer.

EMBODIMENT FOR CARRYING OUT THE INVENTION

The following section will describe a preferred embodiment of the present invention based on the drawings. In the following description, an example will be described in which the above-described configurations of the invention of this application are combined.

The following section will describe the examples of the following combinations:

Embodiment 1: the method (a) of hiding the I/O device+ the activation timing (d)

Embodiment 2: the method (a) of hiding the I/O device+ the activation timing (e)

Embodiment 3: the method (b) of hiding the I/O device+ the activation timing (d)

Embodiment 4: the method (b) of hiding the I/O device+ the activation timing (e)

Embodiment 5: the method (c) of hiding the I/O device+ the activation timing (d)

Embodiment 6: the method (c) of hiding the I/O device+ the activation timing (e)

Embodiment 1 (Power Supply Control by the Microcomputer Etc.) ((a)+(d))

In Embodiment 1, an example of the combinations as described below will be described. Specifically, as a means to hide the I/O devices other than an I/O device of the minimum configuration, the means (a) is used that was described in the "means for solving the problem" section. Specifically, the power supply control by a microcomputer is provided.

The hidden I/O devices are reactivated at the timing (d) described in the section regarding the means for solving the problem. Specifically, the hidden I/O devices are reactivated at the activation of the Boot Loader.

The following section will describe Embodiment 1 in detail with regard to the features as described above.

Figure 1:
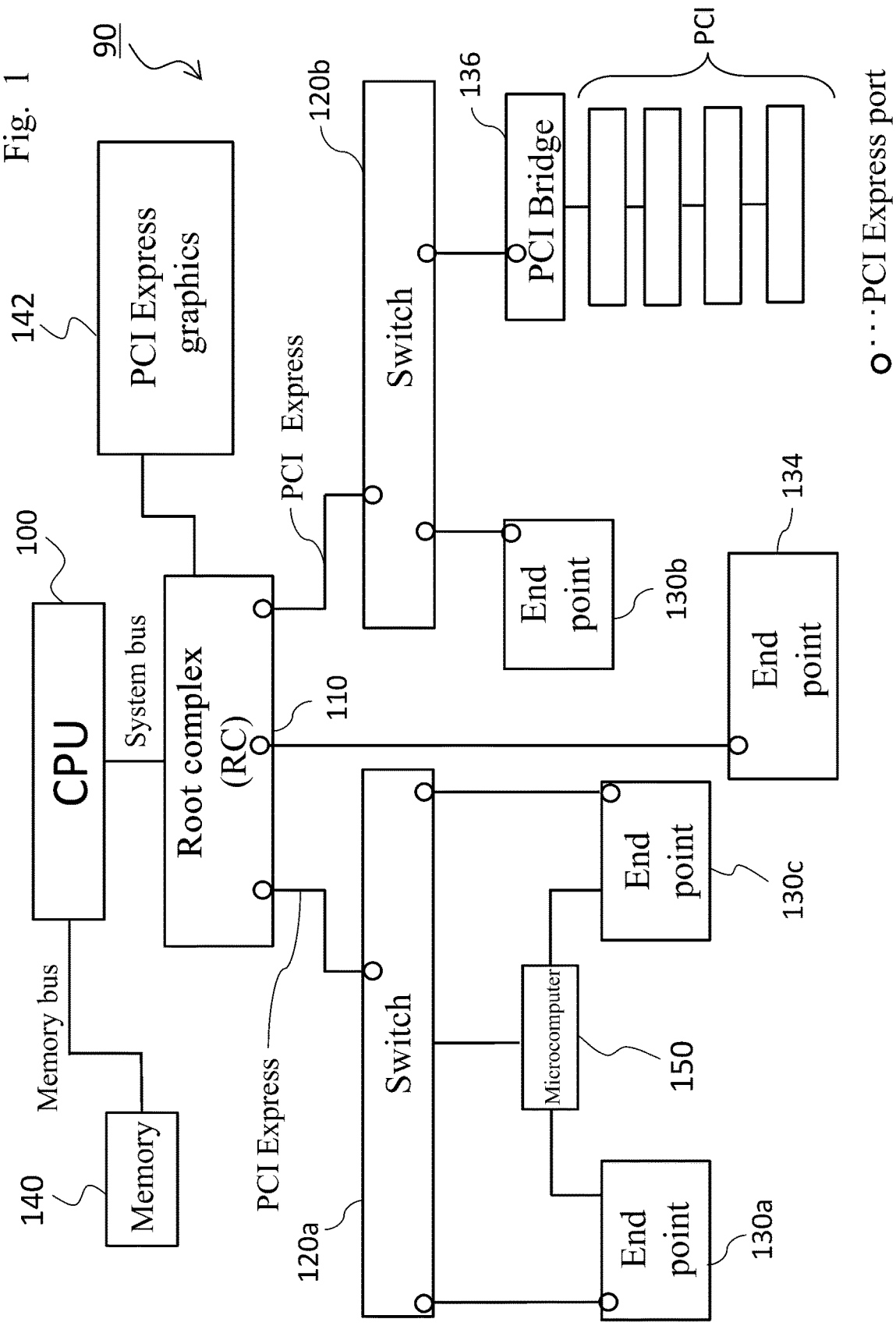
FIG. 1 is a block diagram illustrating the configuration of a computer 90 according to Embodiments 1 and 2.
Figure 10:
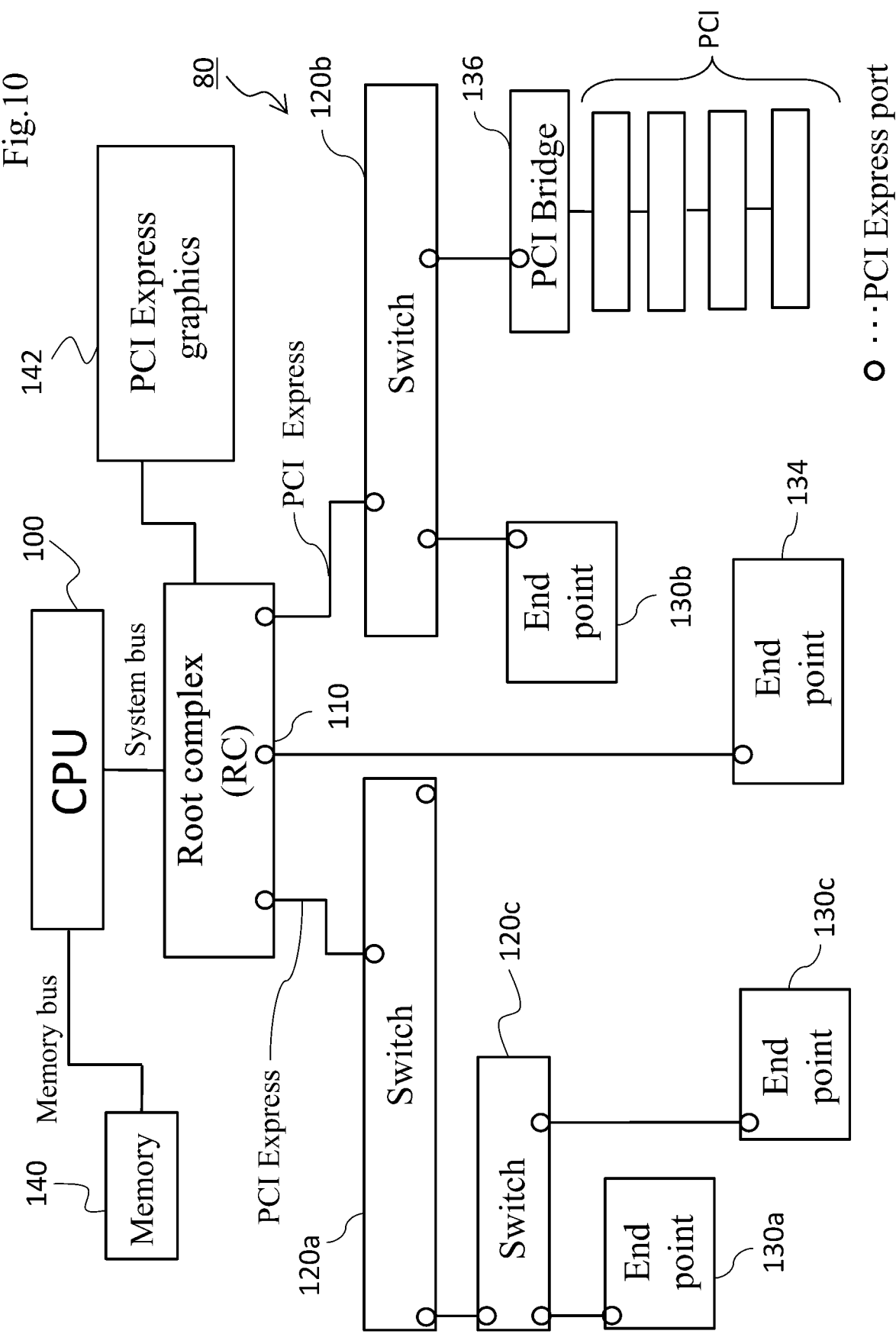
FIG. 10 illustrates the general configuration of a computer 80 including an internal slot of the PCI-Express.

FIG. 1 is a block diagram illustrating the configuration of the computer 90 according to Embodiment 1. The configuration shown in this drawing is substantially similar to the configuration of the conventional computer already described and shown in FIG. 10.

The CPU 100 is connected to an RC (root complex) 110. The RC 110 has switches 120*a*, 120*b*, and 120*c*. These switches 120 may be connected in a multi-stage manner.

The PCI-Express ports of the switches 120 are connected to general PCI-Express end points 130*a*, 130*b*, and 130*c*. The RC 110 is directly connected to the root complex end point 134. In FIG. 1, the mark ○ shows a PCI-Express port.

As shown in FIG. 1, a PCI bridge 136 is provided that provides the protocol conversion with a PCI bus. This bridge is used to provide the conversion from the PCI-Express to the PCI bus.

The CPU 100 is connected to the memory 140 via a memory bus. The RC 110 is connected to the PCI-Express graphics 142.

Figure 4:
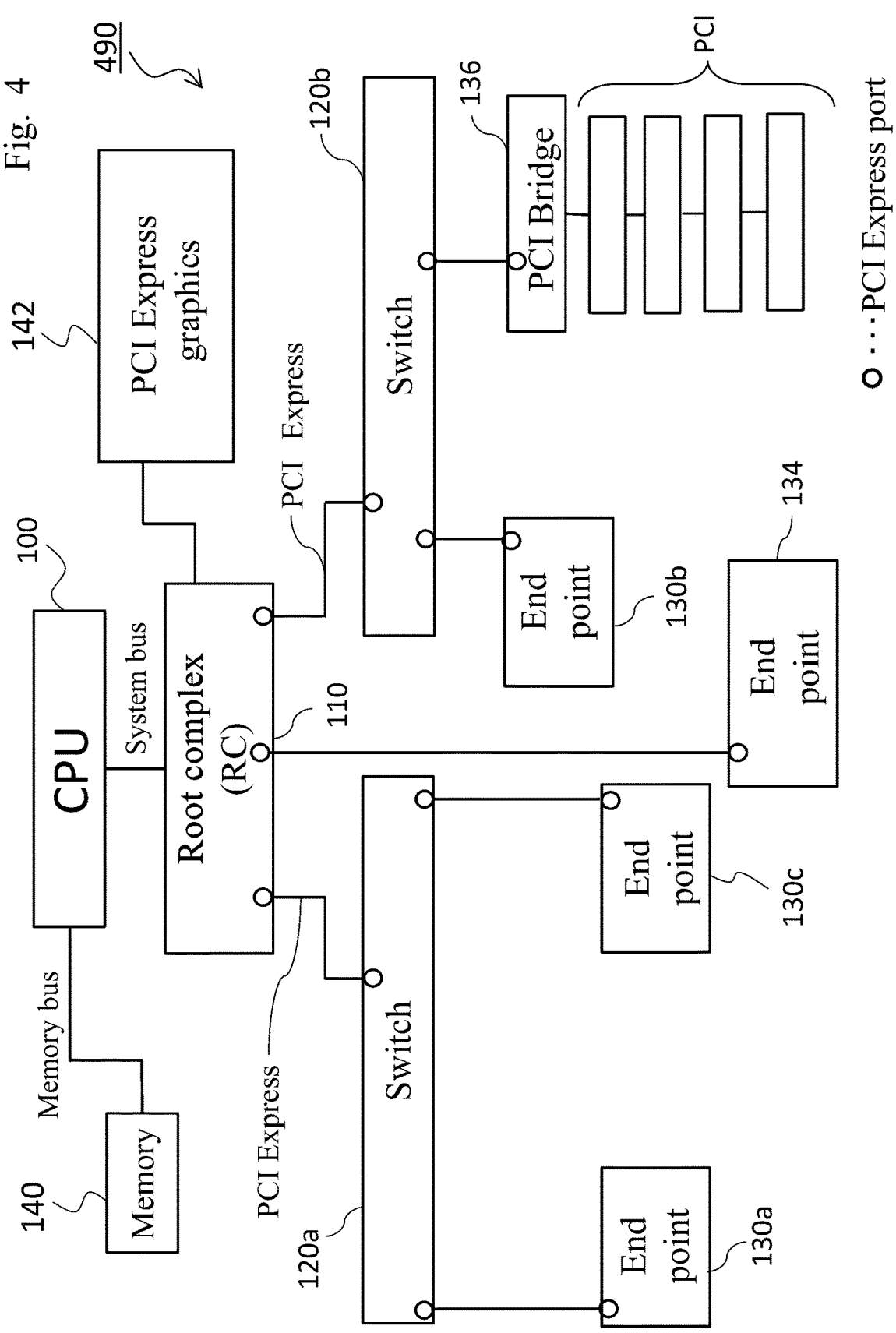
FIG. 4 is a block diagram illustrating the configuration of a computer 490 according to Embodiments 3 and 4.

As in FIG. 4, FIG. 1 is drawn to mainly represent the PCI-Express and actually includes, in addition to the memory 140 (see FIG. 1), a storage means such as a hard disk. The PC1-Express graphics 142 is connected to a display apparatus and has a mouse, a keyboard (not shown) or the like connected to a system bus (see FIG. 1) via a predetermined interface.

Minimum configuration required for the activation

The computer 90 shown in FIG. 1 is configured to have an end point 130*b* and the root complex end point 134 as the minimum-required configuration required for the activation, for example. The connection of these components can provide the activation of the computer 90.

Embodiment 1 has a configuration in which a microcomputer 150 is provided so that the power supply to end points 130*a* and 130*c* that are I/O devices other than the minimum-required configuration during the activation of the computer 90. Such a configuration allows the computer 90 can hide, during the activation thereof, the I/O devices other than minimum-required I/O device (end points 130*a* and 130*c*), thus providing the smooth activation.

The microcomputer 150 is a microcomputer that operates to be independent of the computer 90 and that monitors the status of the computer 90. In the status where the computer is not powered ON, the power supply to the end points 130*a* and 130*c* is blocked. After the computer 90 is activated, when the computer 90 issues a signal to cancel the blocking of the power supply, then the microcomputer 90 cancels the blocking of the power supply to the end points 130*a* and 130*c*. This microcomputer 150 itself is an independent computer separate from the computer 90 and is preferably operated by a predetermined secondary battery, for example.

Activation Sequence

Figure 2:
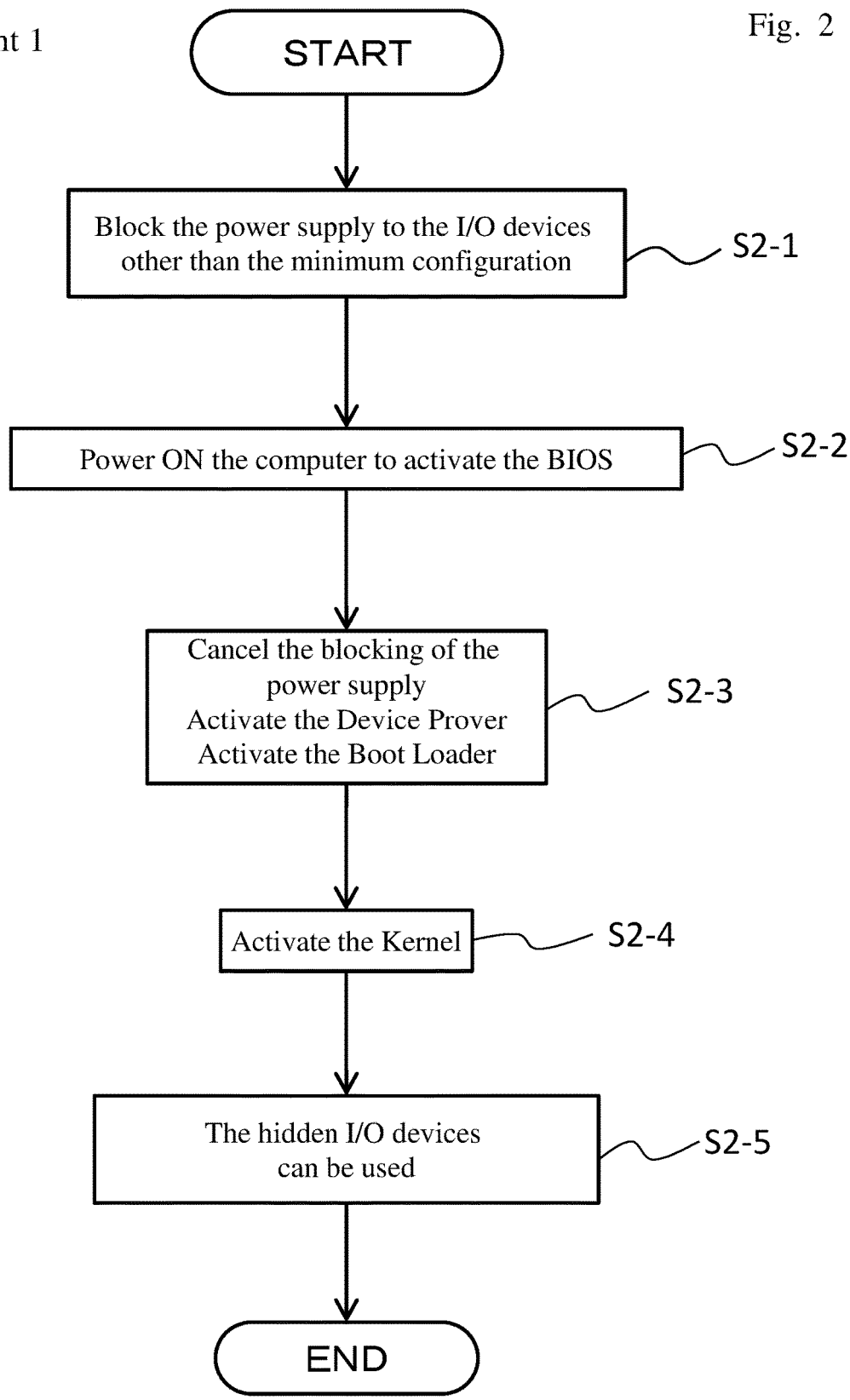
FIG. 2 is a flowchart illustrating the activation operation of the computer 90 in Embodiment 1.

The following section will describe a specific activation sequence based on the flowchart shown in FIG. 2.

First, in Step S2-1, the microcomputer 150 blocks the power supply to the I/O devices other than minimum configuration. The I/O devices other than minimum configuration are the end point 130a and the end point 130c. The microcomputer 150 controls a power supply control element and the like of the power supply line of the end points 130a and 130c so that no power is supplied thereto. Thus, when a user powers ON this computer 90 in this status, no power is supplied to the power supply line of the end points 130a and 130c and the end points 130a and 130c remain in a so-called OFF status.

In Step S2-2, the user powers ON the computer 90. Then, the BIOS is activated to execute a so-called BIOS operation. This BIOS operation includes an operation to search an available I/O device to prepare a device list, for example.

In Step S2-3, the Boot Loader is activated. In an initial stage of the activation of the Boot Loader, the Device Prover is firstly activated. This Device Prover controls the microcomputer 150 to cancel the blocking of the power supply. Since the computer 90 is already powered ON, the power is immediately supplied to the I/O devices 130a and 130c. In this status, the Device Prover proves again a switch 120a connected to the I/O devices 130a and 130c to recognize the I/O devices 130a and 130c. Based on this recognition result, the Device Prover prepares a device list. Thereafter, the Boot Loader is activated and the OS is loaded.

The Device Prover is a program to sense an I/O device at a predetermined position. The term "the activation of the Device Prover" in claims means that the CPU and the like starts the execution of the program 24 of the Device Prover to research the existence of the I/O device to start various functions and operations described herein. The program of the Device Prover describes various functions explained herein, including functions to enable (connect) and disable (disconnect) the I/O device, for example. These functions called "enable" and "disable" or also may be simply called "ON" and "OFF".

The program of the Device Prover also may describe a function to prepare a so-called device list. The wording "the Device Prover prepares a device list" herein means a function of the CPU or the like to execute the program of the Device Prover to prepare the device list.

In Embodiment 1, the I/O devices 130a and 130c are connected to the switch 120a of the PCI-Express. Thus, the Device Prover performs an operation to firstly read the configuration space suitable for the PCI-Express to assign a required BAR (Base Address Register). This BAR determines and assigns the I/O space that can be used by the device as well as the capacity and the position of the memory space.

In Step S2-4, the OS Kernel is activated after which the OS is activated as in a general computer.

In Step S, 2-5, the OS or various applications can use the I/O devices 130a and 130c based on the above device list.

By the operation as described above, the computer 90 can be smoothly activated without causing the stoppage of the BIOS during the activation.

Embodiment 1 is characterized in that the microcomputer 150 is provided to control the power supply of the I/O devices 130a and 130c other than the I/O device of the minimum configuration to block the power supply to the I/O devices 130a and 130c other than minimum configuration when the computer 90 is powered ON. This consequently provides the smooth activation of the BIOS. Embodiment 1 is further characterized in that, during the activation of the Boot Loader, the Device Prover is activated to cancel the blocking of the power supply to prove again the I/O devices 130a and 130c. Furthermore, the Device Prover prepares a device list regarding the I/O device(s)recognized through the second proving, thus allowing the I/O devices 130a and 130c to be used by the OS, for example.

Embodiment 1 is an embodiment in which the means (a) described in the "means for solving the problem" section described above is used to hide devices and the hidden I/O devices are activated at the timing (d).

MODIFICATION EXAMPLE 1

In the above embodiment 1, an example was described in which the I/O devices other than minimum configuration are hidden (or the power supply is blocked). However, not all of the I/O devices other than minimum configuration are required to be hidden. Specifically, some I/O device in addition to the I/O device of the minimum configuration also may be activated without being hidden so long as the smooth activation is possible.

However, as described in the "problem" section, the smooth activation of the computer is made difficult by the existence of any I/O device for which the BIOS memory management range is undesirably exceeded. This can be considered that the computer can be smoothly activated by hiding at least the I/O device for which the memory management range is undesirably exceeded.

Based on Such a Concept,

"hiding the I/O devices other than minimum configuration" the above Step S2-1 may be preferably substituted with:

"hiding the I/O device for which the BIOS memory management range is undesirably exceeded" (Modification Example 1).

Embodiment 2 ((a)+(e))

Embodiment 2 is an embodiment in which the timing (d) in the above Embodiment 1 is substituted with the timing (e).

Specifically:

the means (a) is used as a means to hide the I/O device having the I/O devices other than minimum configuration described in the "means for solving the problem" section. Specifically, the power supply control by a microcomputer is performed.

The hidden I/O devices are reactivated at the timing (e) described in the "means for solving the problem" section. Specifically, the hidden I/O devices are reactivated during the activation of the OS Kernel.

Embodiment 2 will be described in detail mainly with regard to the feature as described above.

Figure 3:
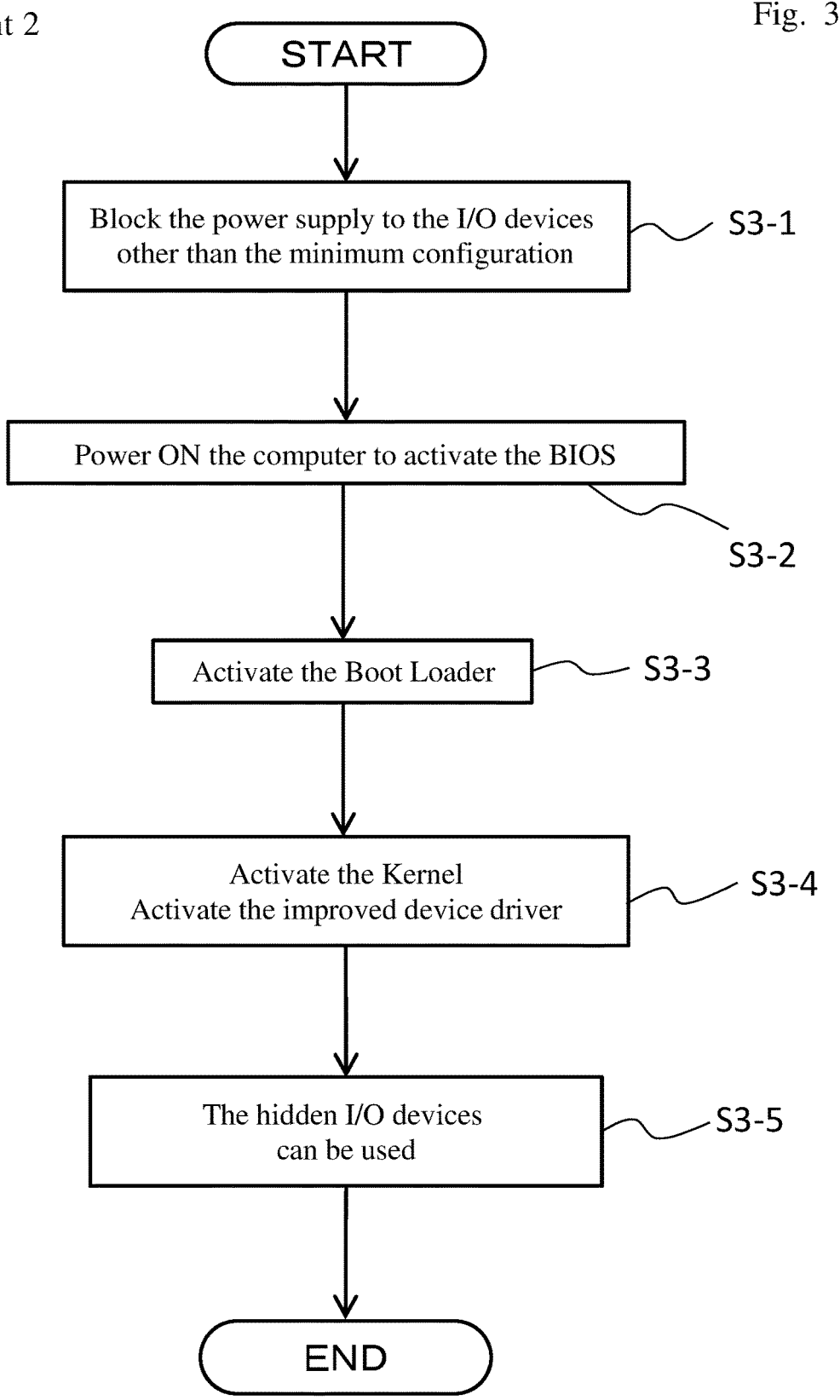
FIG. 3 is a flowchart illustrating the activation operation of the computer 90 in Embodiment 2.

In an example described in Embodiment 2, the computer 90 has a configuration shown in FIG. 1. FIG. 3 is a flowchart illustrating the operation of the method of activating the computer according to Embodiment 2.

First, the operations in Step S3-1 and Step S3-2 are the same as the operation described for FIG. 2. Specifically, the above means (a) is used as a means to hide the I/O devices other than the I/O device of the minimum configuration. The microcomputer 150 blocks the power supply.

In Step S3-3, the Boot Loader is activated.

In Step S3-4, after the activation of the Boot Loader, the OS Kernel is activated. During the activation of the OS Kernel, an improved driver of the hidden I/O devices is also activated. The improved driver is a driver that has, in addition to the function of the conventional driver, a function to power ON the above blocked power supply and that has the same functions as the remaining functions of the conventional driver. This improved driver can be used to power ON again the power supply blocked in Step S3-1. Specifically, the microcomputer 150 is controlled to power ON the hidden I/O devices. In this manner, after the hidden I/O devices are powered ON, an operation substantially similar to that of the conventional driver is performed. Specifically, an operation is performed to recognize the I/O devices powered ON to include the recognized devices in a device list, for example. In order to use the improved driver as described above, the OS Kernel may require a predetermined patch.

Through the operation as described above, the hidden I/O devices can be used (Step S3-5). Specifically, after Step S3-5, the hidden I/O devices can be used by the OS or various applications.

MODIFICATION EXAMPLE 2

In the above Embodiment 2, an example was described in which the I/O devices other than minimum configuration are hidden (an example in which the power supply is blocked). However, the computer can be presumably activated so long as at least an I/O device is hidden for which the memory management range is undesirably exceeded.

Based on the concept as described above,

"hiding the I/O devices other than minimum configuration" in the above Step S3-1 may be also preferably substituted with:

"hiding the I/O devices for which the BIOS memory management range is undesirably exceeded" (Modification Example 2).

Embodiment 3 (The Use of the PCI-Express Switch (b)+(d))

In Embodiment 3, an example will be described for an example of the combination as shown below. Specifically:
  the means (b) described in the "means for solving the problem" section is used as a means to hide the I/O devices other than the I/O device of the minimum configuration. Specifically, the downstream side of the switch is disabled and hidden.
  The hidden I/O devices are reactivated at the timing (d) described in the "means for solving the problem" section. Specifically, the hidden I/O devices are reactivated during the activation of the OS Kernel.

The following section will describe Embodiment 3 in detail mainly with regard to such a feature.

FIG. 4 is a block diagram illustrating the configuration of the computer 490 according to Embodiment 3. The configuration shown in this drawing omits the microcomputer 150 described for Embodiment 1 and is similar to that of FIG. 1 except for the omission of the microcomputer 150.

The minimum-required configuration required for the activation

In the computer 490 shown in FIG. 4, the minimum-required configuration required for the activation has the end point 130b and the root complex end point 134, for example. The connection of the former and the latter can provide the activation of the computer 490.

In Embodiment 3, an example will be described in which the I/O devices other than the minimum configuration are the end points 130a and 130c connected to the downstream side of the switch 120a. In Embodiment 3, in order to hide the end points 130a and 130c as the I/O devices other than minimum configuration, the BIOS is activated in the status in which the downstream side of the switch 120a is disabled. By the operation as described above, the computer 490 can be activated while hiding the I/O devices other than minimum-required I/O device (the end points 130a and 130c) and thus can be smoothly activated.

The switch 120a is a PCI-Express switch that controls the operation based on a command from the exterior, for example. PCI-Express switches include a known switch having a function to enable or disable a predetermined downstream side-port, for example. Such a switch may configure the switch 120a.

In the status in which the end points 130a and 130c are hidden, the BIOS can be activated to smoothly activate the computer 490.

After the computer 490 is activated, the computer 490 controls the switch 120a to enable the downstream side, thereby providing the use of the hidden I/O devices.

Activation Sequence

Figure 5:
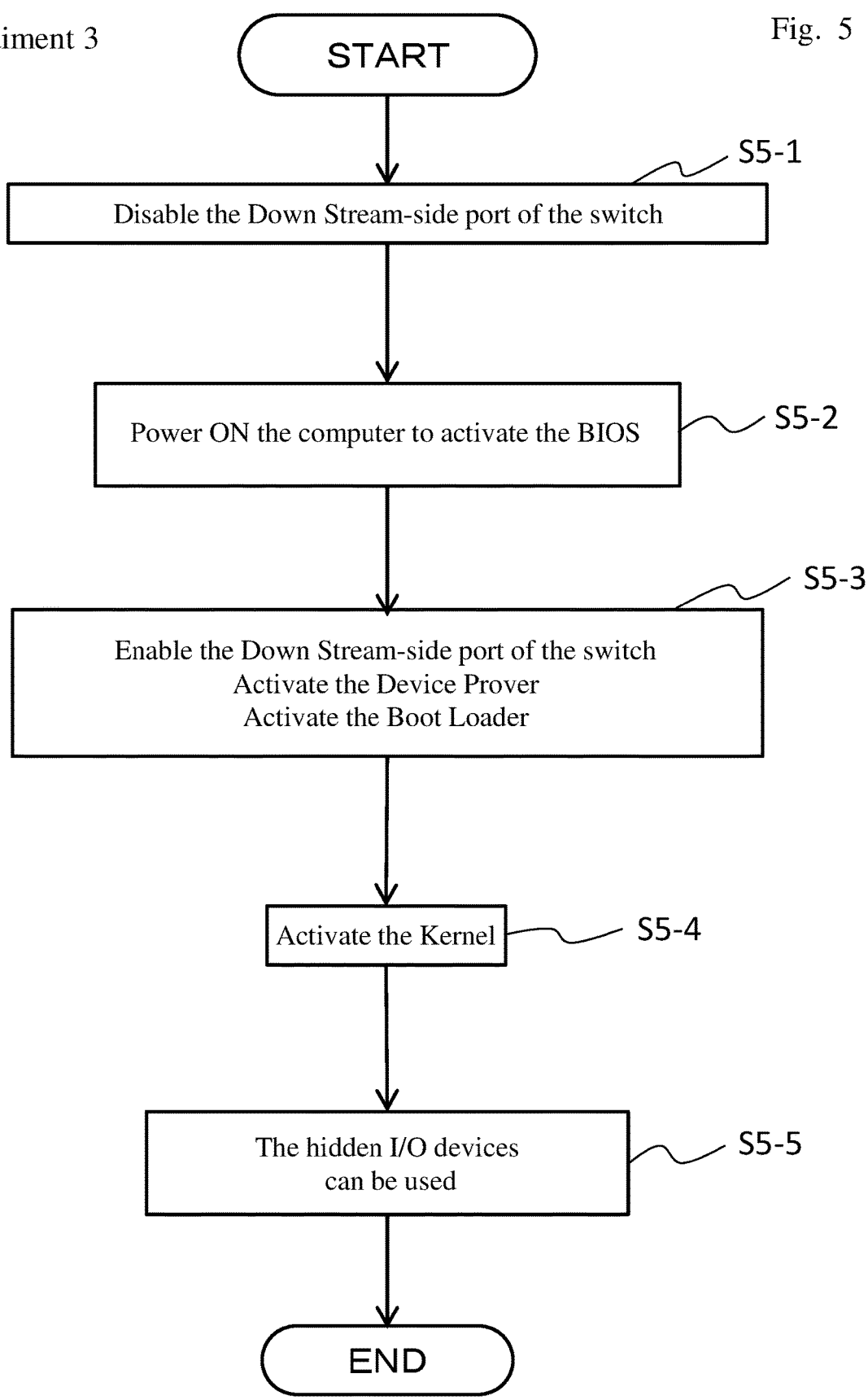
FIG. 5 is a flowchart illustrating the activation operation of the computer 490 in Embodiment 3.

The following section will describe a specific activation sequence based on the flowchart shown in FIG. 5.

First, in Step S5-1, the downstream side of the switch 120a as a PCI-Express switch is set in a disabled status, the computer 490 is powered ON, and the BIOS is activated.

There are various methods to set the downstream side of the switch 120a in the disabled status.

The first method uses the switch 120a including a control terminal to receive a control signal from the exterior. A PCI-Express switch has been known in which the use of a signal applied to the control terminal as described above can define an operation mode (during the activation or the like). Thus, a circuit may be provided to generate such a signal to supply the signal to the switch 120a. For example, a predetermined DIP (Dual Inline Pin) switch may be preferably used to supply a signal having a suitable electric potential to the above control terminal. A suitable electric potential may be prepared using a so-called pull-up or pull-down circuit.

In the case of the switch 120a as described above, the operation mode at the power ON can be defined by a signal applied to the control terminal to disable the downstream-side port. After the computer 490 is activated, the hidden I/O devices can be used by using a command from the CPU 100 to enable the downstream-side port.

The second method allows the CPU 100 to send a command to the switch 120a at the previous shut down of the computer 490 to disable the downstream-side port. The switch 120a has been known that, when the switch 120a is controlled by such a command, the control details (setting details) are stored in an internal (nonvolatile) register, for example and the control details are used in the next activation. Such a switch 120 can be used to disable the downstream-side port in the next activation.

The third method uses such a switch 120a that always keeps the downstream side in the disabled status by resetting the power-ON operation. The use of such a switch 120a allows, without requiring a particular operation, the downstream side to be always in the disabled status when the next power is ON. The use of such a switch 120a allows, after the power is ON, the downstream side to be set in the enabled status or the disabled status based on various settings. Such a setting is preferably performed by the Device Prover (which will be described later) (see Step S5-3 described later, for example).

In Step S5-2, when the user powers ON the computer 490 in the status as described above, the BIOS is activated to execute a so-called BIOS operation. This BIOS operation includes an operation to research available I/O devices to prepare a device list, for example.

The first, second, and third methods have been described as a method to set the downstream side always in the disabled status. These methods correspond to a preferred example of the second hiding step of claims.

In Step S5-3, the Boot Loader is activated. In the initial stage of the activation of the Boot Loader, the Device Prover is firstly activated. This Device Prover controls the switch 120a to cause the shift of downstream-side port from the disabled status to the enabled status. This is executed by allowing the CPU 100 to execute the Device Prover to send a predetermined command to the switch 120a to thereby cause a shift of the downstream-side port to the enabled status.

In this status, the Device Prover proves again the switch 120a connected to the I/O devices 130a and 130c to recognize the I/O devices 130a and 130c. Based on this recognition result, the Device Prover prepares a device list. Thereafter, the Boot Loader is activated and the OS is loaded.

In Embodiment 3, the I/O devices 130a and 130c are connected to the PCI-Express switch 120a. Thus, as in Embodiment 1, the Device Prover performs an operation to firstly read the configuration space suitable for the PCI-Express to assign a required BAR (Base Address Register).

Steps S5-4 and S5-5 are the same as those of Embodiment 1 in which the OS Kernel is activated and the OS is activated. Thereafter, as in Embodiment 1, based on the above device list, the OS or various applications can use the I/O devices 130a and 130c.

Through the operation as described above, the computer 490 can be smoothly activated without causing the undesired stoppage of the BIOS during the activation.

Embodiment 3 is characterized in that the I/O devices 130a and 130c other than the I/O devices of the minimum configuration are connected to the downstream-side port of the switch 120a as a PCI-Express switch and the computer 490 is powered ON and activated in the status where the downstream-side port is disabled. As a result, the I/O devices 130a and 130c can be hidden during the activation of the computer 490, thus providing the smooth activation of the BIOS.

Embodiment 3 is also characterized in that the Device Prover is activated during the activation of the Boot Loader to enable the downstream-side port of the switch 120a. In this status, the Device Prover proves again the I/O devices 130a and 130c. Furthermore, the Device Prover prepares a device list regarding the I/O devices recognized through the second proving, thus allowing the I/O devices 130a and 130c to be used by the OS, for example.

MODIFICATION EXAMPLE 3

In the above Embodiment 3, an example was described in which the I/O devices other than the minimum-required configuration required for the activation are hidden. However, another configuration as in the above Modification Examples 1, 2 and the like also may preferably be used that hides the I/O devices for which the BIOS memory management range is exceeded.

The operation similar to the above operation can be provided even when the minimum-required configuration required for the activation is the end point 130b only and the device configuration for which the memory management range is not exceeded is the end point 130b and the root complex end point 134, for example.

In this case, such an operation is performed to hide end points 130a and 130c connected to the downstream side of the switch 120a as the I/O devices for which the memory management range is exceeded. As a result, the computer 490 can hide, when being activated, the I/O devices for which the memory management range is exceeded (the end points 130a and 130c) and thus can be activated smoothly.

Embodiment 4 ((b)+(e))

Embodiment 4 is an embodiment in which the timing (d) in the above Embodiment 3 is substituted with the timing (e). Specifically:
the means (b) described in the "means for solving the problem" section is used as a means to hide the I/O devices other than the I/O device of the minimum configuration. Specifically, the I/O devices are hidden by disabling the downstream side of the switch.
The hidden I/O devices are reactivated at the timing (e) described in the "means for solving the problem" section. Specifically, the I/O devices are reactivated when the OS is activated.

The following section will describe Embodiment 4 in detail mainly with regard to such a feature.

Figure 6:
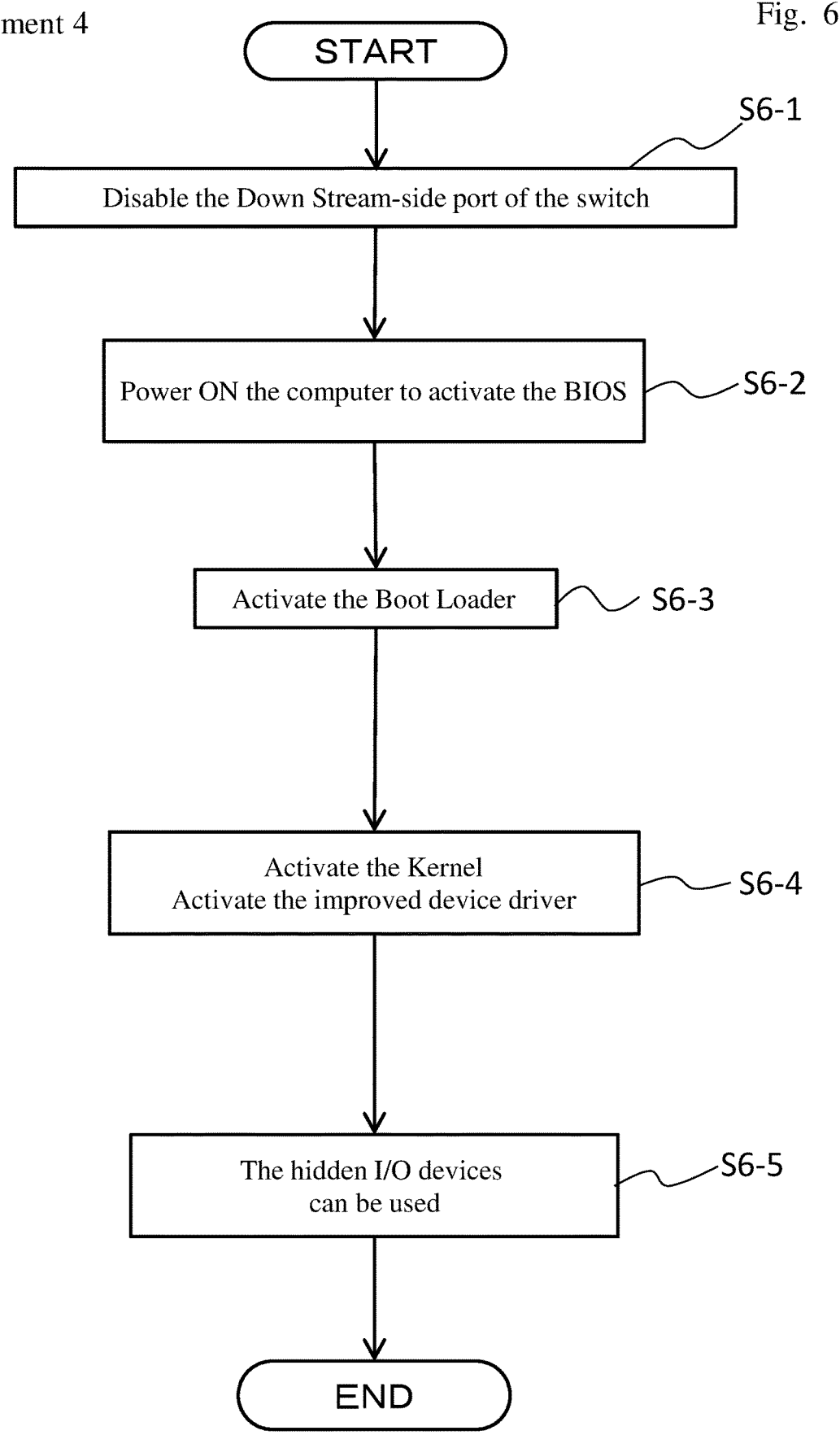
FIG. 6 is a flowchart illustrating the activation operation of the computer 490 in Embodiment 4.

In an example described in Embodiment 4, the computer 490 has the configuration described in Embodiment 3 and shown in FIG. 4. FIG. 6 is the flowchart illustrating the operation of the method of activating a computer according to Embodiment 4.

First, the operation in Step S6-1 is similar to the operation described for Step S5-1 in FIG. 5. Specifically, the above means (b) is used as a means to hide the I/O devices other than the I/O device of the minimum configuration. The downstream-side port of the switch 120a is disabled to power ON the computer. This consequently provides the activation of the BIOS.

The operation in Step S6-2 is also similar to that in Step S5-2 in FIG. 5. Specifically, the user powers ON the computer 490 to activate the BIOS. The BIOS researches available I/O devices to prepare a device list, for example.

The operations of Step S6-3 to Step S6-5 are basically the same as those of Step S3-3 to Step S6-5 of FIG. 3. The former and the latter are different in the method of hiding the I/O devices and thus have a partially-different operation of the improved device driver.

In Step S6-3, the Boot Loader is activated as in Step S3-3 of FIG. 3.

In Step S6-4, after the Boot Loader is activated, the OS Kernel is activated and the improved drivers of the hidden I/O devices are also activated based on the activation of the Kernel.

This improved device driver is a driver that has, in addition to the function of the conventional driver, a function to enable the downstream-side port of the above switch 120a. The other functions of the improved device driver are the same as those of the conventional driver. This improved driver can be used to enable the downstream-side port of the switch 120a disabled in Step S6-1 again.

The operation as described above allows the I/O devices hidden in Step S6-1 to be accessed again. Thus, the improved device driver subsequently executes an operation substantially the same as that of the conventional driver. Specifically, the above accessible I/O devices are recognized to include these I/O devices in the device list, for example.

In order to use such an improved driver, the OS Kernel may require a predetermined patch.

The operation as described above allows the hidden I/O devices to be accessed again (Step S6-5).

MODIFICATION EXAMPLE 4

In the above Embodiment 4, an example was described in which the I/O devices other than the minimum-required configuration required for the activation are hidden. Another configuration as in the above Modification Examples 1, 2, and 3 also may preferably be used in which the I/O devices for which the BIOS memory management range is exceeded. In this case, a similar effect is obtained as in Modification Example 3.

Embodiment 5 (Example Using Exclusive ASIC (c)+(d))

In Embodiment 5, an example of the following combination will be described.

Specifically:
the means (c) described in the "means for solving the problem" section is used as a means to hide the I/O devices other than the I/O device of the minimum configuration. Specifically, the I/O devices are hidden by setting the virtualization in the inactive status.
The hidden I/O devices are reactivated at the timing (d) described in the "means for solving the problem" section. Specifically, the I/O devices are reactivated during the activation of the Boot Loader.

The following section will describe Embodiment 5 in detail mainly with regard to such a feature. In Embodiment 5, the following section will describe a routing control unit developed by the inventors of this application as an example of an exclusive ASIC.

The routing control unit and the exclusive ASIC correspond to a preferred example of the virtual device unit in claims.

Figure 7:
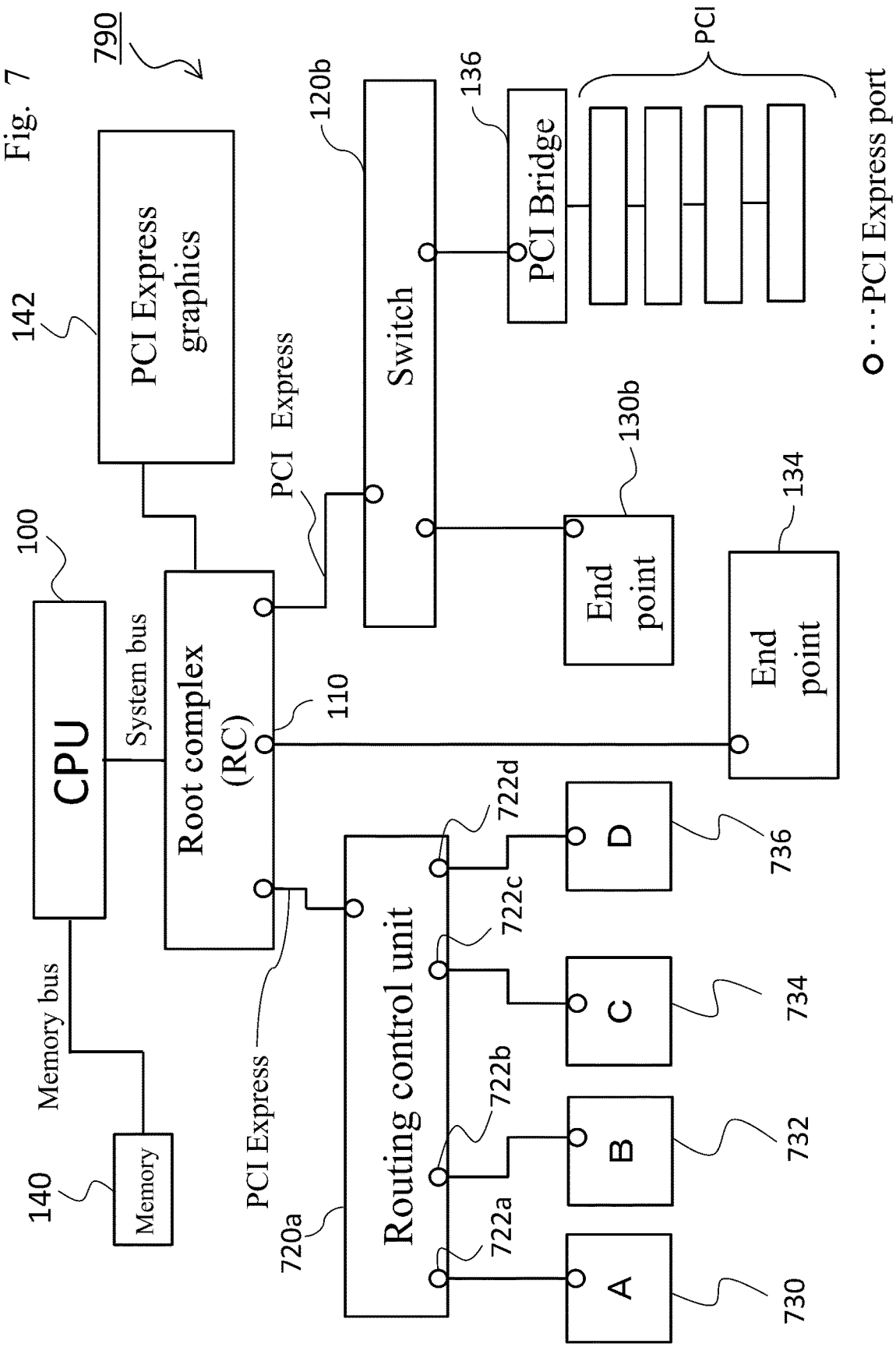
FIG. 7 is a block diagram illustrating the configuration of a computer 790 according to Embodiments 5 and 6.

FIG. 7 is a block diagram illustrating the configuration of the computer 790 including this routing control unit. In the configuration shown in this drawing, the switch 120*a* in FIG. 4 described in Embodiments 3 and 4 is substituted with a routing control unit 720*a*.

This routing control unit 720*a* is a unit developed by the inventors of this application in order to introduce the routing control for the PCI-Express. As has been well-known, the PCI-Express is a PtoP communication path and does not have a routing control function. According to the inventors of this application, this routing control unit is configured so that the TLP of the PCI-Express includes a routing control address to provide a routing control to additionally provide a network function.

Thus, from the network viewpoint, this routing control unit may be a hub-like apparatus. This routing control unit 720*a* is the switch 10 described in FIG. 11 and is an apparatus to additionally have a function to integrate a plurality of node computers. In particular, this routing control unit 720*a* realizes functions as shown below.

The PCI-Express having the routing control function can provide the connection between the port and other computers.
The routing control function can provide the connection of more PCI-Express devices. In particular, the connection with other computers as described above allows the user to virtually see the PCI-Express device of the computer as his or her I/O device, thus realizing the virtualization of the I/O device.

The routing control unit 720*a* has these superior functions.

In Embodiment 5, the following section will describe an example of the I/O device visualized using this routing control unit 720*a* as an example of the means (c) (exclusive ASIC) described in the "means for solving the problem" section.

Minimum-required configuration required for the activation

In the computer 790 shown in FIG. 7, the minimum-required configuration required for the activation is composed of the end point 130*b* and the root complex end point 134. The connection of these components can provide the activation of the computer 790.

In Embodiment 5, the following section will describe an example to hide, as the I/O devices other than minimum configuration, an I/O device A730, an I/O device B732, an I/O device C734, and an I/O device D736 connected to the respective ports 722*a*, 722*b*, 722*c*, and 722*d* of the routing control unit 720*a*.

Figure 11:
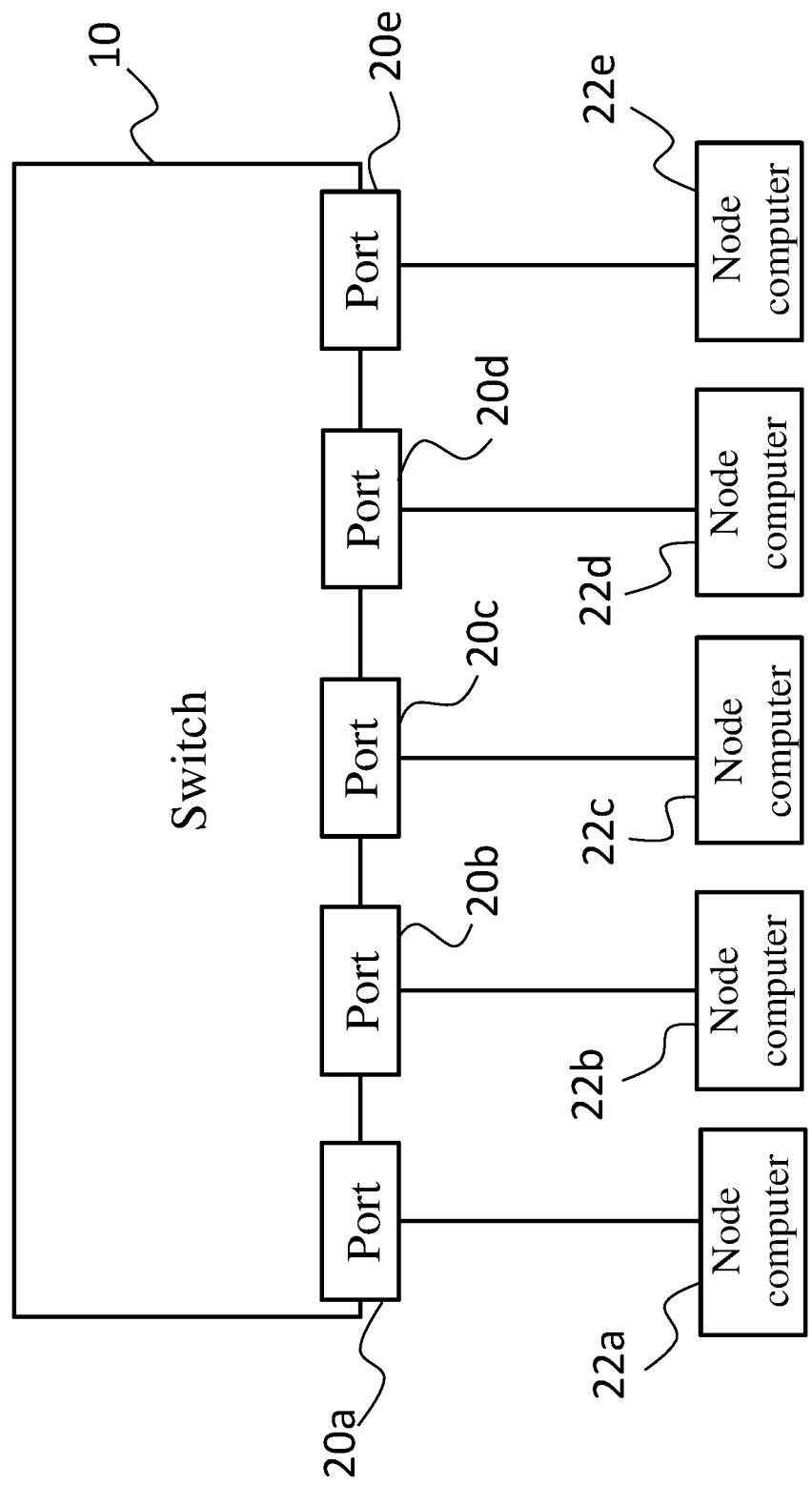
FIG. 11 illustrates the concept that a plurality of node computers 22 are connected using the PCI-Express and using a switch 10 uniquely developed by the inventors of this application.

The I/O device A730 to the I/O device D736 may be a general PCI-Express I/O device or may be a so-called node computer as described in FIG. 11. As described above, the routing control unit 720*a* has a routing control function and thus can provide the connection of the I/O device (virtualized I/O device) of another computer (node computer) as a network using the PCI-Express.

In Embodiment 5, in order to hide the I/O device A730 to the I/O device D736 that are the I/O devices other than minimum configuration, the BIOS is activated while the routing control unit 720*a* is left in the inactive status.

In order to allow the routing control unit 720*a* to provide the routing control function as described above, a table is required that describes a routing control algorithm and routing control rules, for example. Such settings are required to provide the correct function of the routing control unit 720*a*.

In Embodiment 5, a status in which such routing control functions are not set is called an inactive status. A status in which various settings for the routing control are completed and the routing control function is provided is called an active status.

Embodiment 5 is characterized in that the BIOS is activated while the routing control unit 720*a* is in the inactive status in which no settings are provided to thereby hide the I/O devices connected to the ports 722*a* to 722*d*.

By the operation as described above, the computer 790 can hide, during the activation thereof, the I/O devices other than the minimum-required I/O device (the I/O device A730—the I/O device D736), thereby providing the smooth activation.

This routing control unit 720*a* is an example of the means (c) described in the "means for solving the problem" section and is a preferred example of the exclusive ASIC.

After the computer 790 is activated, the CPU 100 of the computer 790 loads, to the routing control unit 720*a*, a program for realizing a predetermined routing control algorithm, various routing rules for the routing control and the like to cause the shift of the routing control unit 720*a* from the inactive status to the active status (a status in which routing control operation is possible). Thereafter, the hidden I/O devices A730 to D736 and the like can be accessed and used.

Activation Sequence

Next, a specific activation sequence will be described based on the flowchart shown in FIG. 8.

First, in Step S8-1, the routing control unit 720a is set in the inactive status. It is generally considered that the inactive status is the inactive status is autonomously provided when no settings are set as described above.

In Step S8-2, when the user powers ON the computer 790 in the status as described above, then Motherboard BIOS is activated to perform a so-called BIOS operation including an operation to research an available I/O device to prepare a device list, for example.

Embodiment 5 is characterized in that the BIOS is activated while the routing control unit 720a is in the nonactive status. The configuration as described above can provide the smooth BIOS activation.

In Step S8-3, the Boot Loader is activated. In the initial stage of the activation of this Boot Loader, a predetermined Device Prover is activated to perform various settings for the routing control unit 720a. This can cause the shift the routing control unit 720a to the active status.

In this status, the Device Prover can recognize and access the I/O devices 730A, 732C, 734D, and 736D via the routing control unit 720a. Based on this recognition result, the Device Prover prepares the device list. Thereafter, the Boot Loader is activated and the OS is loaded.

Steps S8-4 and S8-5 are the same as Steps S2-4 and S2-5 in Embodiment 1 and the OS Kernel is activated to activate the OS. Thereafter, as in Embodiment 1, the OS and various application can use, based on the above device list, the I/O devices 730A, 732C, 734D, and 736D.

By the operation as described above, the computer 790 can be smoothly activated without causing the undesired stoppage of the BIOS during the activation.

Embodiment 5 is characterized in that the I/O devices 730A, 732C, 734D, and 736D other than the I/O device of the minimum configuration are connected via the routing control unit 720a and the computer 790 is activated while the routing control unit 720a is in the nonactive status. This can consequently hide the I/O devices 730A, 732C, 734D, and 736D during the activation of the computer 790, thus providing the smooth activation of the BIOS.

Embodiment 5 is characterized in that the Device Prover is activated during the activation of the Boot Loader to set the routing control unit 720a in the active status. In this status, the Device Prover can access the I/O devices 730A, 732C, 734D, and 736D and also can prepare the device list for these recognized I/O devices. As a result, the OS and applications can use the I/O devices 730A, 732C, 734D, and 736D.

MODIFICATION EXAMPLE 5

In the above Embodiment 5, an example was shown in which the I/O devices other than the minimum-required configuration required for the activation were hidden. However, another configuration as in the above Modification Examples 1-4 also may be preferably used in which the I/O devices for which the BIOS memory management range is exceeded are hidden.

For example, the operation similar to the above operation can be provided even when the minimum-required configuration required for the activation is the end point 130b only and the device configuration for which the memory management range is not exceeded is the end point 130b and the root complex end point 134.

In this case, such an operation is performed to hide, as the I/O device for which the memory management range is exceeded, the I/O device A730, the I/O device B732, the I/O device C734, and the I/O device D736 connected to the respective ports 722 of the routing control unit 720a. As a result, the computer 790 can hide, during the activation thereof, the I/O devices for which the memory management range is exceeded (the I/O device A730-the I/O device D736) and thus can provide the smooth activation.

Embodiment 6 ((c)+(e))

Embodiment 6 is an embodiment in which the timing (d) in the above Embodiment 5 is substituted with the timing (e). Specifically:

the means (c) described in the "means for solving the problem" section is used as a means to hide the I/O devices other than the I/O device of the minimum configuration. Specifically, the virtualization function is set in the inactive status to hide the I/O devices.

The hidden I/O devices are reactivated at the timing (e) described in the "means for solving the problem" section. Specifically, the hidden I/O devices are reactivated during the activation of the OS.

The following section will describe Embodiment 6 mainly with regard to such a feature.

Figure 9:
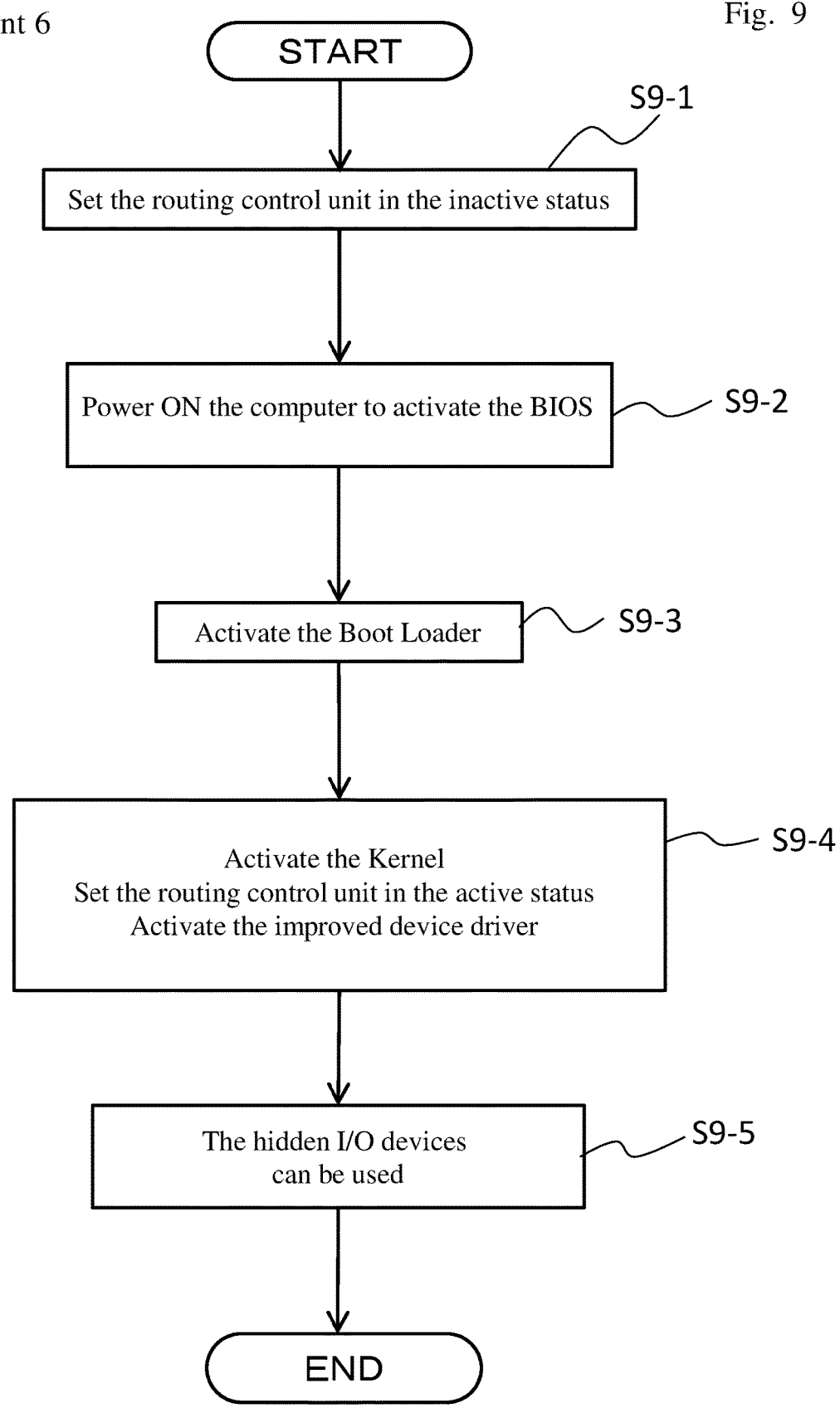
FIG. 9 is a flowchart illustrating the activation operation of the computer 790 in Embodiment 6.

In an example described in Embodiment 6, the computer 790 has a configuration described in Embodiment 5 and shown in FIG. 7. FIG. 9 is a flowchart illustrating the operation of the method of activating a computer according to Embodiment 4.

Figure 8:
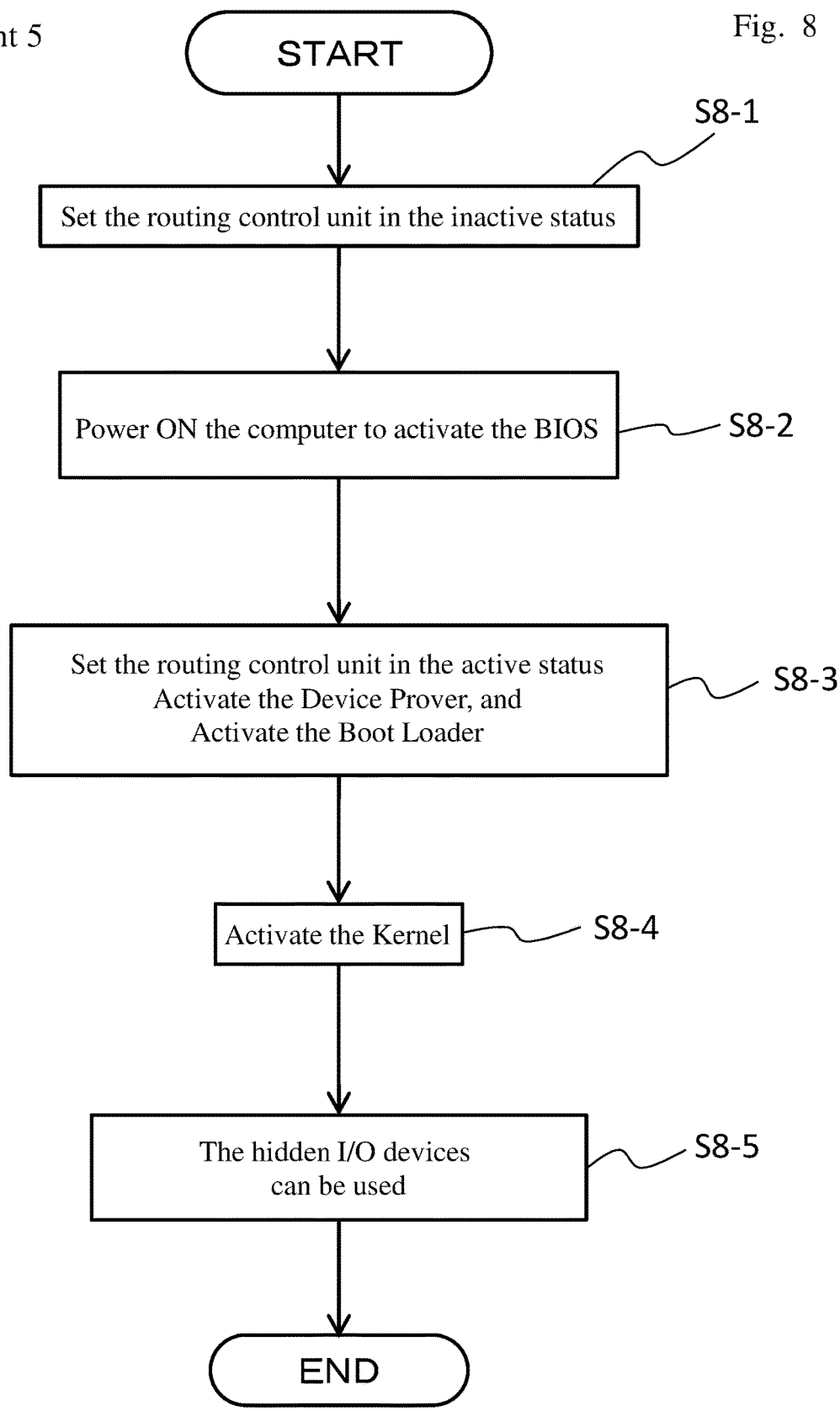
FIG. 8 is a flowchart illustrating the activation operation of the computer 790 in Embodiment 5.

First, the operation in Step S9-1 is the same as the operation described in Step S8-1 of FIG. 8. Specifically, the above means (c) is used as a means to hide the I/O devices other than the I/O device of the minimum configuration and the computer is powered ON while the routing control unit 720a is in the inactive status. As a result, the BIOS is activated.

The operation in Step S9-2 is similar to that of Step S8-2 in FIG. 8. Specifically, the user powers ON the computer 790 and the BIOS is activated. The BIOS researches an available I/O device to prepare the device list, for example.

The operations in Step S9-3-Step S9-5 are basically the same as those of Step S3-3-Step S3-5 of FIG. 3. However, the former and the latter are different in the method of hiding the I/O devices and thus the operation of the improved device driver is partially different.

In Step S9-3, the Boot Loader is activated as in Step S3-3 of FIG. 3.

In Step S9-4, after the Boot Loader is activated, the OS Kernel is activated and the improved drivers of the I/O hidden devices are also activated in accordance with the activation of the Kernel.

This improved device driver is a driver that has a function, in addition to the function of the conventional driver, to set the above routing control unit 720a in the active status. The other functions are the same as those of the conventional driver. In other words, this improved device driver sets the routing control rules of the routing control unit 720a and the like to cause the shift to the active status. As a result, the computer 790 can use the connected I/O devices 730A, 732B, 734C, and 736D, for example.

The computer 790 can also access the connected I/O device 730A, 732B, 734C, 736D and the like as a virtual I/O device.

Through the operation as described above, an access can be provided to the I/O devices hidden in Step S9-1. Thus, the improved device driver can subsequently subject the accessible I/O devices to the same operation as that of the conventional driver. Specifically, an operation is performed to recognize the accessible I/O devices to include the I/O devices in the device list, for example. In order to use the improved driver as described above, the OS Kernel may require a predetermined patch.

The operation as described above allows the I/O devices to be user (Step S9-5).

MODIFICATION EXAMPLE 6

In the above Embodiment 6, an example was described in which the I/O devices other than the minimum-required configuration required for the activation are hidden. Another configuration as in the above Modification Examples 1-4 and 5 may be used in which the I/O devices for which the BIOS memory management range is exceeded are hidden. This configuration also may provide an operation and an effect similar to that of Modification Example 5.

EXPLANATION OF REFERENCE NUMERALS

10 Switch
20a, 20b, 20c, 20d, and 20e Port
22a, 22b, 22c, 22d, and 22e Node computer
90, 190, 490, and 790 Computer
100 CPU
110 Root complex
120a, 120b, and 120c Switch
130a, 130b, and 130c End point
134 Root complex end point
136 PCI bridge
140 Memory
142 PCI-Express graphics
720a Routing control unit
722a, 722b, 722c, and 722d Port
730 I/O device A
732 I/O device B
734 I/O device C
736 I/O device D

The invention claimed is:

1. A method of activating a computer comprising:
a first hiding step of blocking a power supply to Input/Output (I/O) devices other than a minimum I/O device required to activate the computer;
a step of powering ON the computer;
a first cancellation step of allowing a Device Prover to cancel the blocking of the power supply in the first hiding step, after a BIOS of the computer is activated and before the Device Prover enables ports connected with the I/O devices; and
a Boot Loader activation step of activating a Boot Loader of an operating system (OS) of the computer after the ports of the I/O devices for which the blocking of the power supply is cancelled are enabled again by the Device Prover.

2. The method of activating the computer according to claim 1, wherein, in the first hiding step, processors other than the computer block the power supply to the I/O devices other than the minimum I/O device required to activate the computer.

3. The method of activating the computer according to claim 1, wherein the first hiding step blocks the power supply to additional I/O devices not within a memory management range of the BIOS of the computer instead of the I/O devices other than the minimum I/O device required to activate the computer.

4. A method of activating a computer comprising:
a first hiding step of blocking a power supply to Input/Output (I/O) devices other than a minimum I/O device required to activate the computer;
a step of powering ON the computer;
a second cancellation step of allowing a Device Prover to cancel the blocking of the power supply in the first hiding step, after an Operating System (OS) Kernel of the computer is activated and before the Device Prover enables ports connected with the I/O devices; and
a step of allowing the Device Prover to enable again the ports of the I/O devices for which the blocking of the power supply is cancelled.

5. A method of activating a computer, wherein the computer includes a switch that connects Input/Output (I/O) devices included in the computer, the I/O devices other than a minimum I/O device required to activate the computer are connected to a downstream side of the switch, and an upstream side of the switch is connected to a system bus of the computer, the method comprising:
a second hiding step of disabling the downstream side of the switch;
a step of powering ON the computer;
a third cancellation step of allowing a Device Prover to enable the downstream side of the switch, after a BIOS of the computer is activated and before the Device Prover enables ports connected with the I/O devices; and
a Boot Loader activation step of allowing the Device Prover to enable again ports connected with the I/O devices via the switch having the enabled downstream side to subsequently activate a Boot Loader of an Operating System (OS) of the computer.

6. The method of activating the computer according to claim 5, wherein, in the second hiding step, after a power supply is once blocked, a circuit outputting a signal to disable the downstream side of the switch disables the downstream side of the switch.

7. The method of activating the computer according to claim 5, wherein:
in the second hiding step, a command is sent to the switch so as to disable the downstream side of the switch, and
the switch further includes a storage to store a setting status in which the downstream side is disabled.

8. The method of activating the computer according to claim 5, wherein the switch is a Peripheral Component Interconnect (PCI) Express switch.

9. The method of activating the computer according to claim 5, wherein the downstream side of the switch is connected to additional I/O devices not within a memory management range of the BIOS of the computer instead of the minimum I/O device required to activate the computer.

10. A method of activating a computer, wherein the computer includes a switch that connects Input/Output (I/O) devices included in the computer, the I/O devices other than a minimum I/O device required to activate the computer are connected to a downstream side of the switch, and an upstream side of the switch is connected to a system bus of the computer, and the method comprising:

a second hiding step of disabling the downstream side of the switch;

a step of powering ON the computer;

a fourth cancellation step of allowing a Device Prover to enable the downstream side of the switch, after an Operating System (OS) Kernal of the computer is activated; and a step of allowing the Device Prover to enable ports connected with the I/O devices via the switch having the enabled downstream side.

11. A method of activating a computer, wherein the computer includes a virtual device unit to connect an Input/Output (I/O) device as a virtual device to the computer and I/O devices other than a minimum I/O device required to activate the computer are connected to the computer via the virtual device unit, the method comprising:

a third hiding step of setting the virtual device unit in an inactive status;

a step of powering ON the computer;

a fifth cancellation step of allowing a Device Prover to set the virtual device unit in an active status, after a BIOS of the computer is activated and before ports of the I/O devices are enabled by the Device Prover; and a Boot Loader activation step of activating a Boot Loader of an Operating System (OS) after the I/O devices used as the virtual device are enabled again by the Device Prover via the virtual device unit.

12. The method of activating the computer according to claim 11, wherein the downstream side of the switch is connected to additional I/O devices not within a memory management range of the BIOS of the computer instead of the minimum I/O device required to activate the computer.

13. A method of activating a computer, wherein the computer includes a virtual device unit to connect an Input/Output (I/O) device as a virtual device to the computer and I/O devices other than a minimum I/O device required to activate the computer are connected to the computer via the virtual device unit, the method comprising:

a third hiding step of setting the virtual device unit in an inactive status;

a step of powering ON the computer;

a sixth cancellation step of allowing a Device Prover to set the virtual device unit in an active status, after a Kernel of an Operating System (OS) of the computer is activated; and a step of allowing the Device Prover to enable again ports connected with the I/O devices via the virtual device unit having the active status.

* * * * *